United States Patent
Miyamoto et al.

(10) Patent No.: US 8,937,417 B2
(45) Date of Patent: Jan. 20, 2015

(54) ROTATING ELECTRIC MACHINE AND WIND POWER GENERATION SYSTEM

(75) Inventors: Yasuhiro Miyamoto, Kitakyushu (JP); Hiroshi Tsumagari, Kitakyushu (JP); Daisuke Morishita, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 366 days.

(21) Appl. No.: 13/297,271

(22) Filed: Nov. 16, 2011

(65) Prior Publication Data

US 2012/0187696 A1    Jul. 26, 2012

(30) Foreign Application Priority Data

Jan. 20, 2011 (JP) ................. 2011-009665
Jan. 20, 2011 (JP) ................. 2011-009666
May 26, 2011 (JP) ................. 2011-118020

(51) Int. Cl.
    H02K 21/12         (2006.01)
(52) U.S. Cl.
    USPC ................. 310/156.08; 310/156.18
(58) Field of Classification Search
    CPC ....... H02K 1/276; H02K 1/28; H02K 1/2746; H02K 1/27
    USPC ........................... 310/156.01–156.84; 290/55
    See application file for complete search history.

(56) References Cited

U.S. PATENT DOCUMENTS

| | | | |
|---|---|---|---|
| 5,006,045 A | 4/1991 | Shimoda et al. | |
| 5,223,759 A | 6/1993 | Shimoda et al. | |
| 5,369,325 A | 11/1994 | Nagate et al. | |
| 5,508,576 A | 4/1996 | Nagate et al. | |
| 5,672,926 A | 9/1997 | Brandes et al. | |
| 5,821,710 A | 10/1998 | Masuzawa et al. | |
| 6,894,413 B2 | 5/2005 | Nakano et al. | |
| 7,105,971 B2 | 9/2006 | Asai et al. | |
| 7,151,334 B2 * | 12/2006 | Asaka et al. | 310/156.12 |
| 7,163,072 B2 | 1/2007 | Yamaguchi | |
| 7,378,774 B2 * | 5/2008 | Torii et al. | 310/216.041 |
| 7,847,456 B2 | 12/2010 | Kori et al. | |
| 7,994,666 B2 | 8/2011 | Kori et al. | |
| 8,581,464 B2 * | 11/2013 | Lokhandwalla et al. | 310/156.12 |
| 2004/0007930 A1 | 1/2004 | Asai et al. | |
| 2011/0140561 A1 * | 6/2011 | Clark et al. | 310/156.12 |

(Continued)

FOREIGN PATENT DOCUMENTS

CN      1486527       3/2004
JP      04-071342     3/1992

(Continued)

OTHER PUBLICATIONS

Japanese Office Action for corresponding JP Application No. 2011-118020, Jun. 11, 2013.

(Continued)

*Primary Examiner* — Hanh Nguyen
(74) *Attorney, Agent, or Firm* — Mori & Ward, LLP

(57) ABSTRACT

This rotating electric machine includes a rotor including a rotating shaft portion, a rotor yoke surrounding the rotating shaft portion and a rotor core, arranged on the outer peripheral surface of the rotor yoke, having a plurality of permanent magnets circumferentially arranged thereon at intervals, and a stator arranged to be opposed to the outer peripheral surface of the rotor, while the rotor yoke and the inner peripheral portion of the rotor core are fixed to each other with a fixing member.

19 Claims, 23 Drawing Sheets

ENLARGED VIEW AS VIEWED FROM SIDE ALONG ARROW A IN FIG. 1 (FIRST EMBODIMENT)

(56) References Cited

U.S. PATENT DOCUMENTS

| | | | |
|---|---|---|---|
| 2012/0025534 A1* | 2/2012 | Miyamoto et al. | 290/55 |
| 2012/0112466 A1 | 5/2012 | Junge et al. | |
| 2012/0133230 A1* | 5/2012 | Jansen | 310/156.12 |

FOREIGN PATENT DOCUMENTS

| | | |
|---|---|---|
| JP | 07-20050 U | 4/1995 |
| JP | 08-088947 | 4/1996 |
| JP | 08-116635 | 5/1996 |
| JP | 08-251891 | 9/1996 |
| JP | 10-155262 | 6/1998 |
| JP | 2000-324738 | 11/2000 |
| JP | 2003-309953 | 10/2003 |
| JP | 2004-282889 | 10/2004 |
| JP | 2005-168128 | 6/2005 |
| JP | 2005-318765 | 11/2005 |
| JP | 2006-217741 | 8/2006 |
| JP | 2007-060860 | 3/2007 |
| JP | 2008-131813 | 6/2008 |
| JP | 2008-178165 | 7/2008 |
| JP | 2010-200459 | 9/2010 |
| JP | 2010-273426 | 12/2010 |
| WO | 2003/053734 | 7/2003 |
| WO | WO 03/055045 | 7/2003 |
| WO | WO 2011/006810 | 1/2011 |

OTHER PUBLICATIONS

Japanese Office Action for corresponding JP Application No. 2011-009665, Mar. 8, 2011.

Japanese Office Action for corresponding JP Application No. 2011-009666, Mar. 8, 2011.

Touichi Takeuchi,"Electromechanical Structure Theory" Kogyo Tosho, Nov. 25, 1939, pp. 130-131, Part 2, Chapter 9, Japan.

Korean Office Action for corresponding KR Application No. 10-2012-0026211, Jun. 25, 2014.

Chinese Office Action for corresponding CN Application No. 201110278488.0, Sep. 29, 2014.

Japanese Office Action for corresponding JP Application No. 2011-100541, Nov. 18, 2014.

* cited by examiner

FIRST EMBODIMENT

DIAGRAM AS VIEWED FROM SIDE ALONG ARROW A IN FIG. 1 (FIRST EMBODIMENT)

FIG.3 ENLARGED VIEW AS VIEWED FROM SIDE ALONG ARROW A IN FIG. 1 (FIRST EMBODIMENT)

SECTIONAL VIEW TAKEN ALONG LINE 200-200

FIRST EMBODIMENT

FIRST EMBODIMENT

FIRST EMBODIMENT

FIG.14 THIRD EMBODIMENT

SECTIONAL VIEW TAKEN ALONG LINE 400-400

SECTIONAL VIEW TAKEN ALONG LINE 500-500

MODIFICATION OF EACH OF
FIRST TO FOURTH EMBODIMENTS

ROTATING ELECTRIC MACHINE AND WIND POWER GENERATION SYSTEM

CROSS-REFERENCE TO RELATED APPLICATIONS

The priority application number JP2011-009665, Rotating Electric Machine and Wind Power Generation System, Jan. 20, 2011, Yasuhiro Miyamoto, Daisuke Morishita, Hiroshi Tsumagari, upon which this patent application is based is hereby incorporated by reference.

The priority application number JP2011-009666, Rotating Electric Machine and Wind Power Generation System, Jan. 20, 2011, Yasuhiro Miyamoto, Daisuke Morishita, Hiroshi Tsumagari, upon which this patent application is based is hereby incorporated by reference.

The priority application number JP2011-118020, Rotating Electric Machine and Wind Power Generation System, May 26, 2011, Yasuhiro Miyamoto, Daisuke Morishita, Hiroshi Tsumagari, upon which this patent application is based is hereby incorporated by reference.

BACKGROUND OF THE INVENTION

1. Field of the Invention

The present invention relates to a rotating electric machine and a wind power generation system.

2. Description of the Background Art

A rotating electric machine including a rotor including a rotor core having a plurality of permanent magnets circumferentially arranged at intervals is known in general.

Japanese Patent Laying-Open No. 2000-324738 discloses an IPM motor (rotating electric machine) including a rotor including an iron core (rotor core) having a plurality of rare earth magnets (permanent magnets) circumferentially embedded therein at intervals. When the rotor of this IPM motor is assembled, a rotating shaft is shrink-fitted into the inner peripheral portion of the iron core, to be fixed to the iron core.

SUMMARY OF THE INVENTION

A rotating electric machine according to a first aspect of the present invention includes a rotor including a rotating shaft portion, a rotor yoke surrounding the rotating shaft portion and a rotor core, arranged on the outer peripheral surface of the rotor yoke, having a plurality of permanent magnets circumferentially arranged thereon at intervals, and a stator arranged to be opposed to the outer peripheral surface of the rotor, while the rotor yoke and the inner peripheral portion of the rotor core are fixed to each other with a fixing member.

A wind power generation system according to a second aspect of the present invention includes a power generator including a rotor and a stator arranged to be opposed to the outer peripheral surface of the rotor and a blade connected to the rotor of the power generator, while the rotor includes the rotating shaft portion, a rotor yoke surrounding the rotating shaft portion, and a rotor core, arranged on the outer peripheral surface of the rotor yoke, having a plurality of permanent magnets circumferentially arranged thereon at intervals, and the rotor yoke and the inner peripheral portion of the rotor core are fixed to each other with a fixing member.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

(First Embodiment)

First, the structure of a wind power generation system 100 including a power generator 1 according to a first embodiment is described with reference to FIG. 1. The power generator 1 is an example of the "rotating electric machine" in the present invention.

Figure 1:
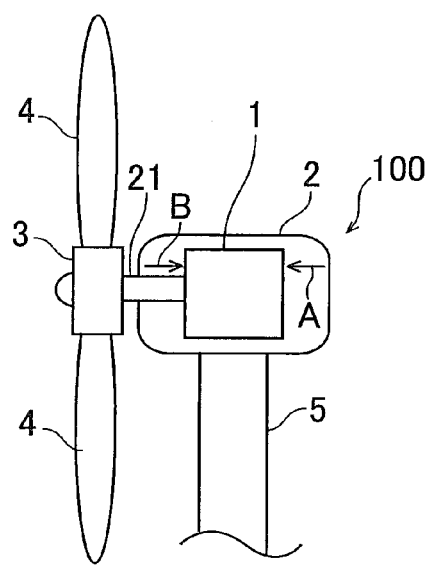
FIG. 1 is a schematic diagram showing the structure of a wind power generation system according to each of first to fourth embodiments of the present invention.

As shown in FIG. 1, the wind power generation system 100 is constituted of the power generator 1, a nacelle 2, a rotor hub 3, a plurality of blades 4 and a tower (support pillar) 5. The power generator 1 is stored in the nacelle 2. The rotor hub 3 is connected to a shaft 21, described later, of the power generator 1. The plurality of blades 4 are mounted on the rotor hub 3. The nacelle 2 is mounted on the tower 5.

The structure of the power generator 1 according to the first embodiment of the present invention is now described with reference to FIGS. 2 to 9.

Figure 2:
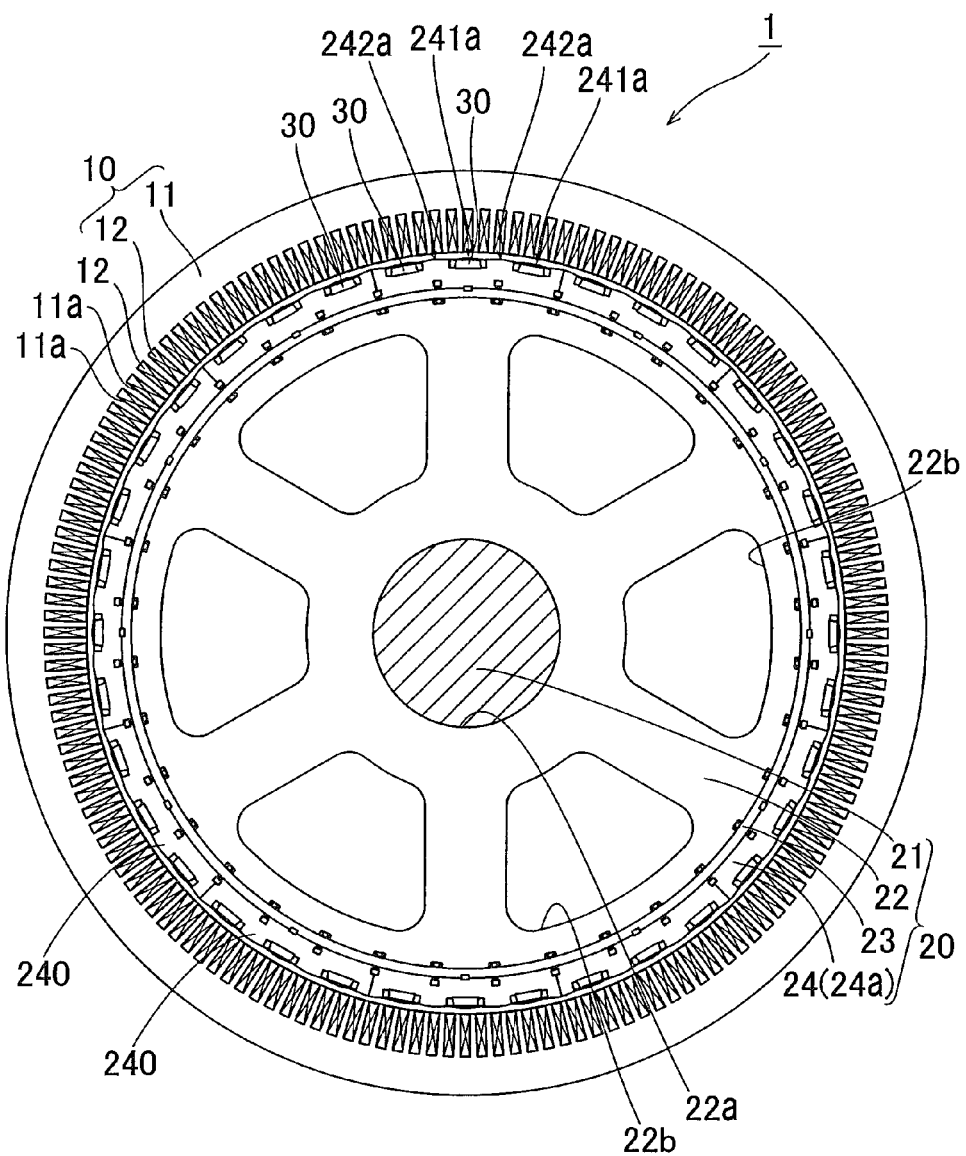
FIG. 2 shows a stator and a rotor of a power generator according to the first embodiment of the present invention as viewed from one side (along arrow A in FIG. 1) in an axial direction.

The power generator 1 includes a stator 10 and a rotor 20, as shown in FIG. 2. The stator 10 is arranged to be opposed to the outer peripheral surface of the rotor 20 at a prescribed space (gap). The stator 10 has a cylindrical shape surrounding the rotor 20. Further, the stator 10 is constituted of a stator core 11 provided with a plurality of slots 11a and a winding 12. The plurality of slots 11a are arranged at substantially equiangular intervals along the inner periphery of the stator core 11. The winding 12 is wound between the plurality of slots 11a in a concentrated or distributed manner.

The rotor 20 is constituted of the shaft 21, a rotor wheel 22, a rotor yoke 23 and a rotor core 24. The shaft 21 is an example of the "rotating shaft portion" in the present invention. The rotor wheel 22 is an example of the "support member" in the present invention.

Figure 5:
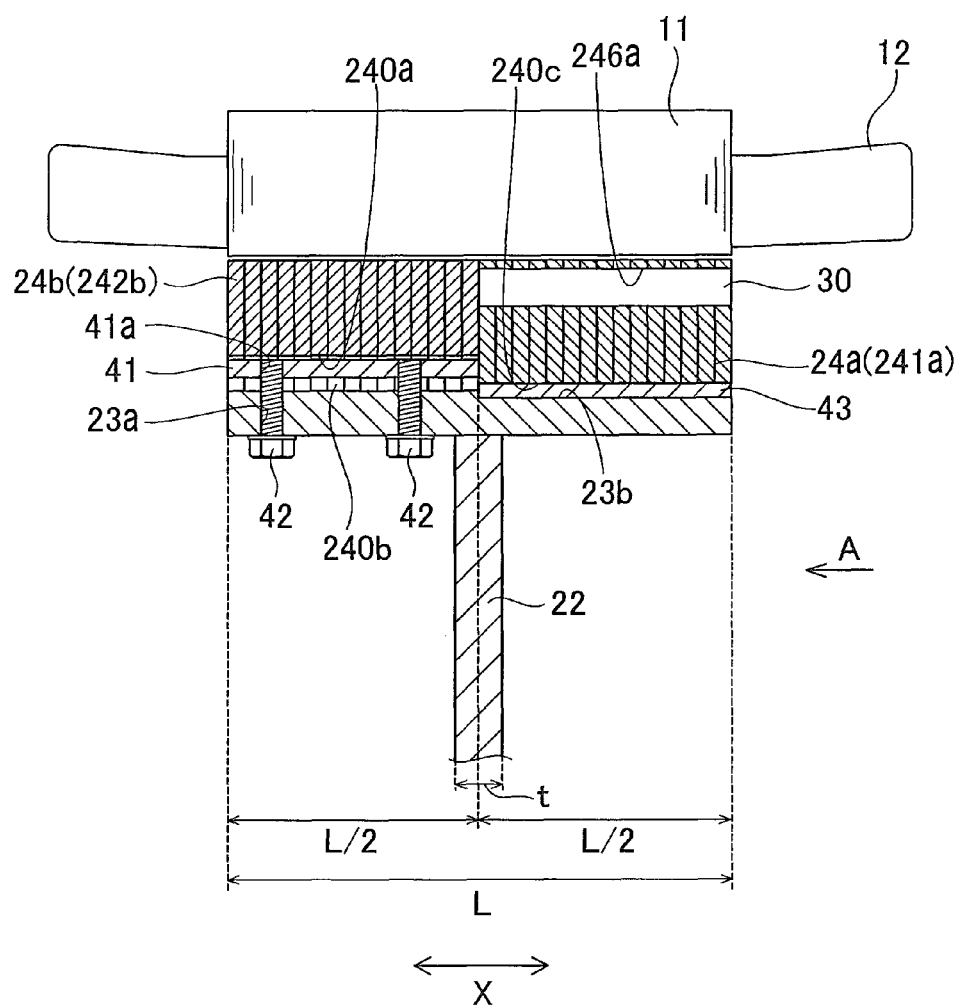
FIG. 5 is a sectional view taken along the lines 200-200 in FIGS. 3 and 4.
Figure 6:
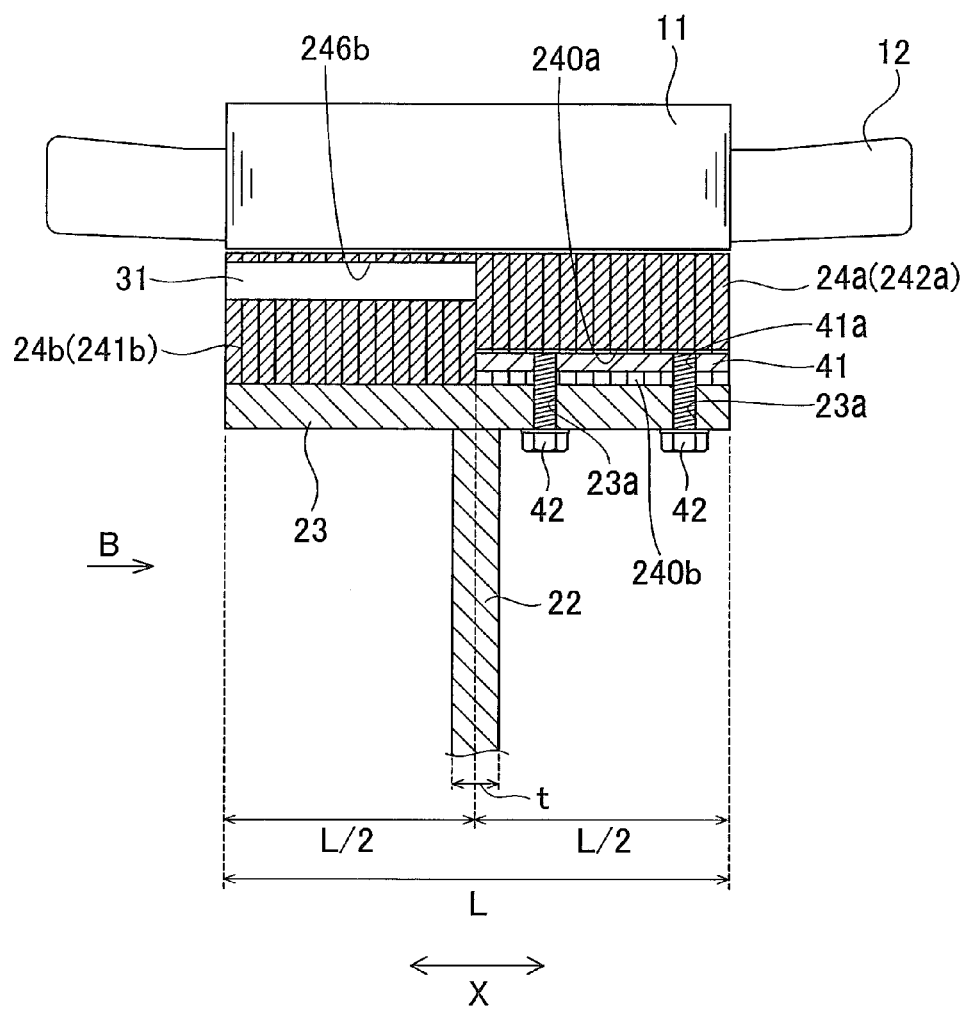
FIG. 6 is a sectional view taken along the lines 300-300 in FIGS. 3 and 4.
Figure 7:
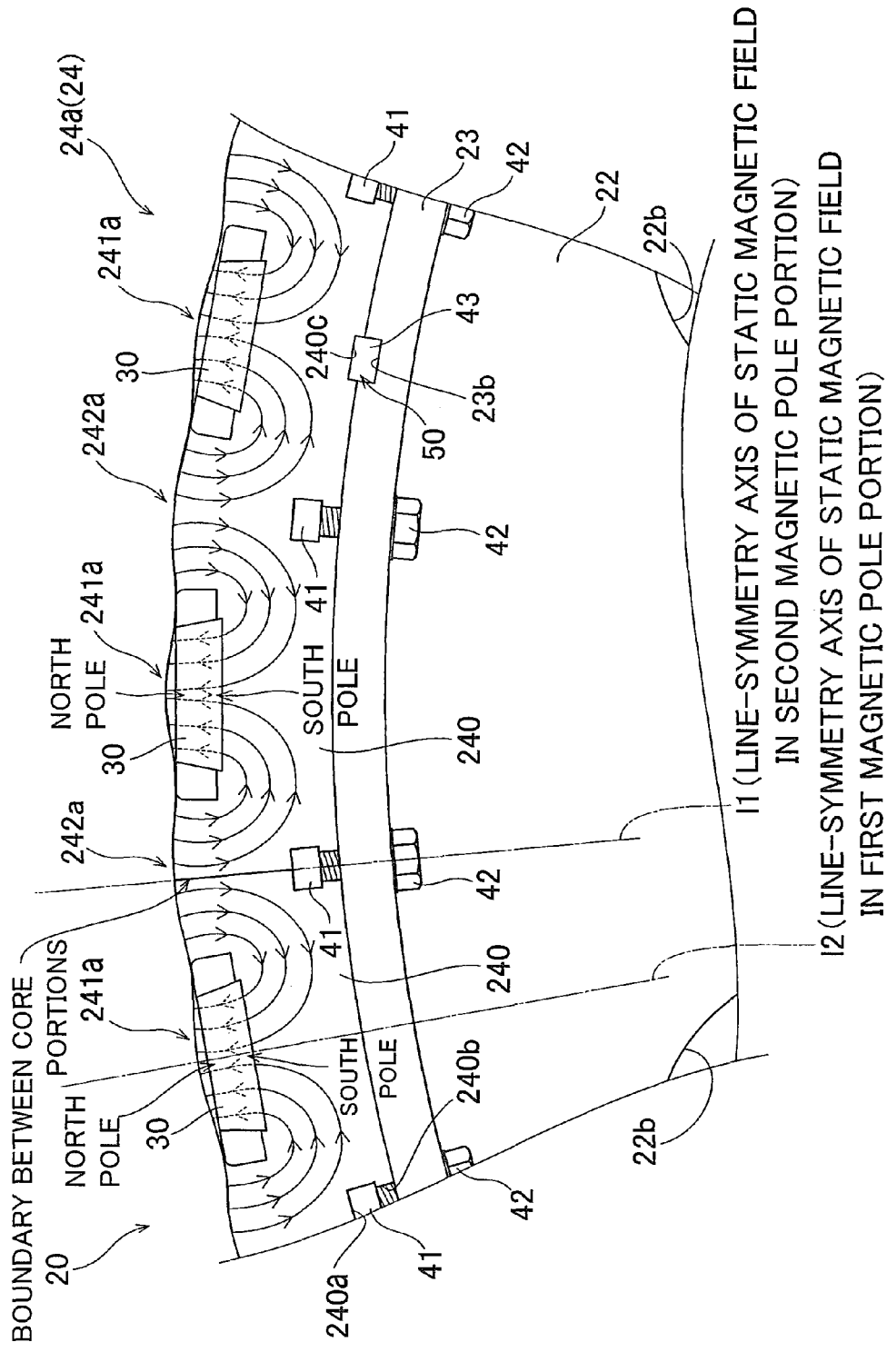
FIG. 7 shows magnetic lines of flux in a rotor core of the power generator according to the first embodiment of the present invention.

The shaft 21 is inserted into a shaft receiving hole 22a provided in the vicinity of a central portion of the rotor wheel 22, to extend in a direction X (see FIG. 1) (hereinafter referred to as an axial direction) through the center of the rotor 20. The rotor wheel 22 is in the form of a disc surrounding the shaft 21 and in contact with the inner peripheral surface of the rotor yoke 23. The rotor wheel 22 is provided with a plurality of openings 22b passing through the same in the axial direction. The rotor yoke 23 is in the form of a cylinder surrounding the shaft 21 and having an inner peripheral surface in contact with the outer peripheral portion of the discoidal rotor wheel 22. The cylindrical rotor yoke 23 is so formed that the length L thereof in the axial direction is larger than the thickness t of the discoidal rotor wheel 22, as shown in FIGS. 5 and 6.

As shown in FIG. 2, the rotor core 24 is in the form of a cylinder having an inner peripheral surface arranged on the outer peripheral surface of the rotor yoke 23. Further, the rotor core 24 is constituted of a plurality of electromagnetic steel plates stacked to overlap with each other in the axial direction, as shown in FIGS. 5 and 6. According to the first embodiment, the rotor core 24 is divided into two portions at a central portion in the axial direction. In other words, the rotor core 24 is constituted of a rotor core 24a (portion of the rotor core 24 on one side (along arrow A in FIG. 1) in the axial direction) and another rotor core 24b (portion of the rotor core 24 on another side (along arrow B in FIG. 1) in the axial direction), which are arranged to overlap with each other in the axial direction.

Figure 3:
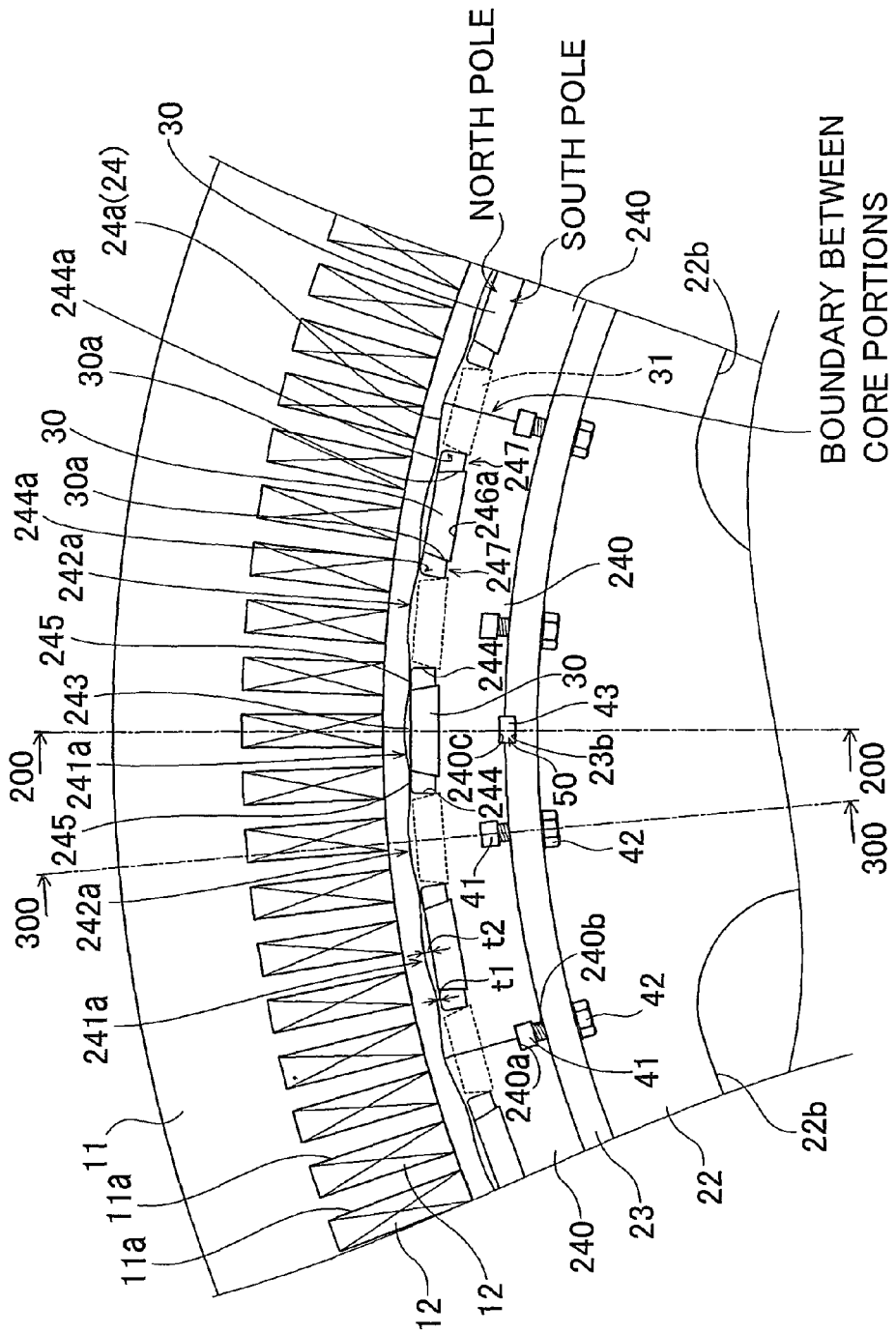
FIG. 3 is an enlarged view of a principal part in FIG. 2.
Figure 4:
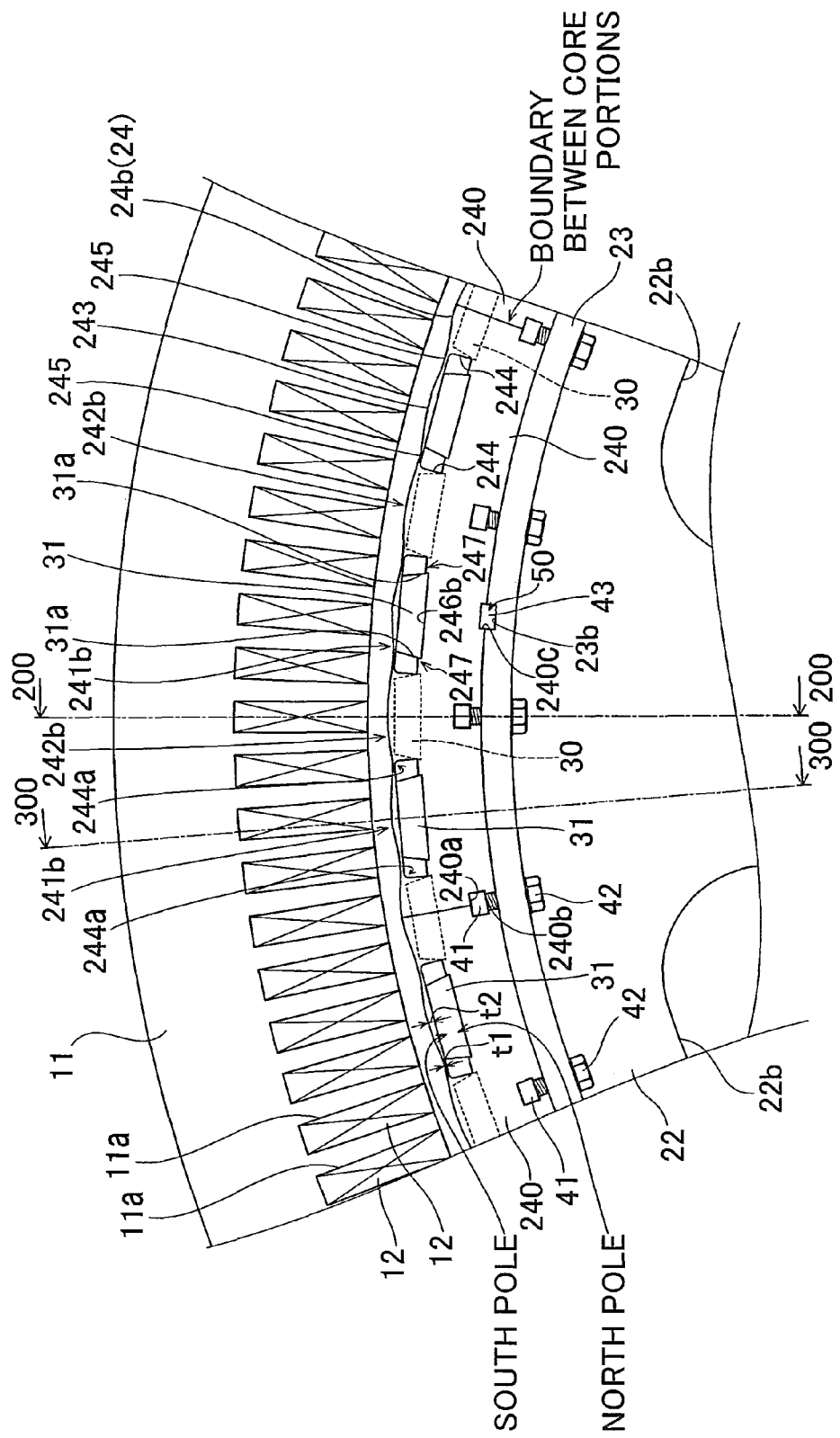
FIG. 4 is an enlarged view of the part shown in FIG. 3 as viewed from another side (along arrow B in FIG. 1) in the axial direction.

As shown in FIGS. 2 to 4, a plurality of permanent magnets 30 and a plurality of permanent magnets 31 are circumferentially embedded in portions of the rotor cores 24a and 24b close to the outer peripheral portions thereof at intervals in the direction of rotation (hereinafter referred to as a circumferential direction) respectively. The structure of the rotor core 24a (24b) having the permanent magnets 30 (31) embedded therein is generally referred to as an IPM (Interior Permanent Magnet) structure.

According to the first embodiment, the rotor core 24a is formed by alternately circumferentially arranging first magnetic pole portions 241a having the permanent magnets 30 and second magnetic pole portions 242a having no permanent magnets 30 one by one, as shown in FIGS. 2 and 3. Similarly, the rotor core 24b is formed by alternately circumferentially arranging first magnetic pole portions 241b having the permanent magnets 31 and second magnetic pole portions 242b having no permanent magnets 31 one by one in the first embodiment, as shown in FIG. 4.

As described later, the plurality of permanent magnets 30 are so magnetized that radial magnetization directions thereof are identical to each other (so that the north poles are provided on the outer peripheral sides). The plurality of permanent magnets 31 are also so magnetized that radial magnetization directions (opposite to the magnetization directions of the permanent magnets 30) thereof are identical to each other (so that the south poles are provided on the outer peripheral sides). The structure of the rotor core 24a (24b) having the plurality of permanent magnets 30 (31) so circumferentially arranged that the radial magnetization directions thereof are identical to each other is generally referred to as a consequent pole structure.

As shown in FIGS. 3 and 4, outer periphery-side surfaces of magnet covering portions 243, described later, of the first magnetic pole portions 241a (241b) are formed to have convex shapes provided with top portions corresponding to central portions of the permanent magnets 30 (31) in the circumferential direction, as viewed from the axial direction. Similarly, outer periphery-side surfaces of the second magnetic pole portions 242a (242b) are formed to have convex shapes provided with top portions corresponding to central portions of the second magnetic pole portions 242a (242b) in the circumferential direction, as viewed from the axial direction. The top portions of the first magnetic pole portions 241a (241b) and the second magnetic pole portions 242a (242b) having the convex shapes are arranged outward beyond coupling portions 245, described later, of the first magnetic pole portions 241a (241b) in the radial direction.

The first magnetic pole portions 241a (241b) are formed to include the magnet covering portions 243 covering the outer peripheral sides of the permanent magnets 30 (31), pairs of voids 244 exposing both end surfaces of the permanent magnets 30 (31) and pairs of coupling portions 245 so provided as to circumferentially extend to correspond to the pairs of voids 244 respectively.

The outer periphery-side surfaces of the magnet covering portions 243 are formed to have the convex shapes provided with the top portions corresponding to the central portions of the permanent magnets 30 (31), as viewed from the axial direction. Corners 244a of the voids 244 closer to the coupling portions 245 as well as to the second magnetic pole portions 242 are formed to have arcuate sectional shapes. The coupling portions 245 are in the form of thin members coupling the magnet covering portions 243 and pairs of second magnetic pole portions 242a (242b) adjacent to the first magnetic pole portions 241a (241b) with each other along the outer periphery of the rotor core 24a (24b). According to the first embodiment, the power generator 1 is so formed that the radial thickness t1 of the coupling portions 245 is smaller than the radial thickness t2 of the central portions of the magnet covering portions 243. For example, the radial thickness t1 of the coupling portions 245 is at least about 1 mm and not more than about 1.5 mm, while the radial thickness t2 of the central portions of the magnet covering portions 243 is at least about 3 mm and not more than about 4 mm.

According to the first embodiment, hole portions 246a (246b) for mounting the permanent magnets 30 (31) are provided to be continuous with the voids 244 of the first magnetic pole portions 241a (241b). The hole portions 246a (246b) are provided with pairs of engaging portions 247 engaging with portions of inclined portions 30a (31a), described later, of the permanent magnets 30 (31) closer to the inner periphery of the rotor core 24a (24b) by coming into contact with the same. The power generator 1 is so formed that the circumferential width of spaces between the pairs of engaging portions 247 is gradually reduced from the inner peripheral side toward the outer peripheral side of the rotor core 24a (24b).

According to the first embodiment, the permanent magnets 30 (31) are formed to have substantially trapezoidal sections as viewed from the axial direction. In other words, the inclined portions 30a (31a) are provided on both end surfaces of the permanent magnets 30 (31) so that the circumferential width of the permanent magnets 30 (31) is gradually reduced from the inner peripheral side toward the outer peripheral side of the rotor core 24a (24b).

According to the first embodiment, the permanent magnets 30 embedded in the first magnetic portions 241a of the rotor core 24a and the permanent magnets 31 embedded in the first magnetic pole portions 241b of the rotor core 24b are magnetized to have polarities different from each other on the outer peripheral sides. More specifically, the permanent magnets 30 are so magnetized that the north poles are provided on the outer peripheral sides in a state mounted on the hole portions 246a of the rotor core 24a through an adhesive or the like, as shown in FIG. 3. On the other hand, the permanent magnets 31 are so magnetized that the south poles are provided on the outer peripheral sides in a state mounted on the hole portions 246b of the rotor core 24b through an adhesive or the like, as shown in FIG. 4.

According to the first embodiment, the rotor cores 24a and 24b are arranged to overlap with each other in the axial direction in a state deviating from each other by a prescribed angle (180° in electrical angle) in the direction of rotation, as shown in FIGS. 3 to 6. In other words, the rotor cores 24a and 24b are so arranged that the first magnetic pole portions 241a of the rotor core 24a and the second magnetic pole portions 242b of the rotor core 24b correspond to each other while the second magnetic pole portions 242a of the rotor core 24a and the first magnetic pole portions 241b of the rotor core 24b correspond to each other. The axial lengths of the rotor cores 24a and 24b are half (L/2) the axial length L of the rotor yoke 23.

According to the first embodiment, the rotor core 24a (24b) is formed to be dividable in the circumferential direction to include a plurality of core portions 240, as shown in FIGS. 2 to 4. Boundaries between the plurality of core portions 240 are arranged on portions corresponding to the second magnetic pole portions 242a (242b) of the rotor core 24a (24b). More specifically, the boundaries between the plurality of core portions 240 are arranged on magnetic boundaries (central portions of the second magnetic pole portions 242a (242b) in the circumferential direction) of the second magnetic pole portions 242a (242b). In other words, the boundaries between the plurality of core portions 240 are arranged to overlap with line-symmetry axes (see a straight line 11 in FIG. 7) of static magnetic fields generated by the permanent magnets 30 in the rotor core 24 (24a).

According to the first embodiment, the boundaries between the plurality of core portions 240 are arranged every four second magnetic pole portions 242a (242b), as shown in FIGS. 3 and 4. In other words, each of the plurality of core portions 240 is formed to include three first magnetic pole portions 241a (241b) arranged between four second magnetic pole portions 242a (242b). The plurality of core portions 240 are formed to have substantially identical shapes (substantially arcuate shapes as viewed from the axial direction) obtained by dividing the cylindrical rotor core 24a (24b) at substantially equiangular intervals, as shown in FIGS. 2 to 4 and 8.

As shown in FIGS. 2 to 7, the inner peripheral portion of the rotor core 24a (24b) and the rotor yoke 23 are fastened to each other by fastening members consisting of nuts 41 and bolts 42, to be fixed to each other. The nuts 41 and the bolts 42 are arranged on portions of the inner peripheral portion of the rotor core 24a (24b) corresponding to the second magnetic pole portions 242a (242b), and arranged on the boundaries between the plurality of core portions 240 constituting the rotor core 24a (24b). The nuts 41 and the bolts 42 are examples of the "fixing member" in the present invention.

Each nut 41 is formed to be inserted into a corresponding nut receiving hole 240a, described later, provided in the inner peripheral portion of the rotor core 24a (24b), as shown in FIGS. 5 and 6. Further, each nut 41 is formed to extend in the axial direction in the state inserted into the nut receiving hole 240a. More specifically, each nut 41 is in the form of a rectangular parallelepiped having the length L/2. This nut 41 is provided with a plurality of (two in the first embodiment) threaded holes 41a, having internal threads formed on the inner surfaces thereof, along the extensional direction (axial direction) thereof. The bolts 42 are formed to be inserted into bolt receiving holes 23a (see FIGS. 5 and 6), described later, provided in the inner peripheral surface of the rotor yoke 23. Further, the bolts 42 are formed to be fitted into the threaded holes 41a of the nuts 41 through groove portions 240b (see FIGS. 3 to 8), described later, of the core portions 240 constituting the rotor core 24a (24b).

Figure 8:
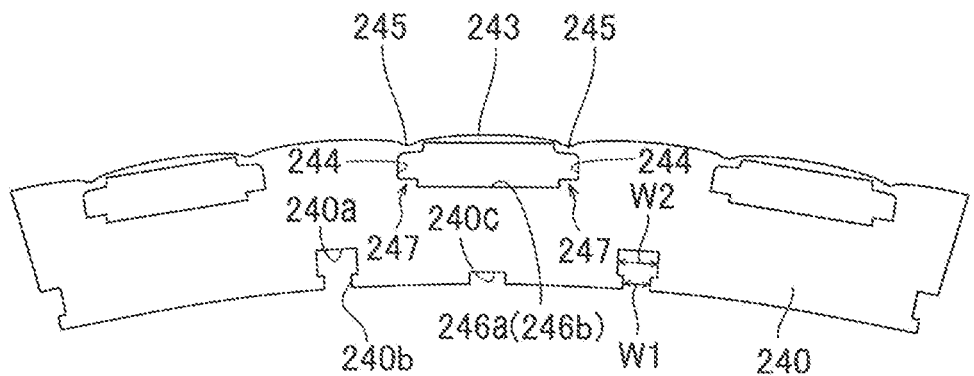
FIG. 8 illustrates core portions constituting a rotor core of the power generator according to the first embodiment of the present invention.
Figure 9:
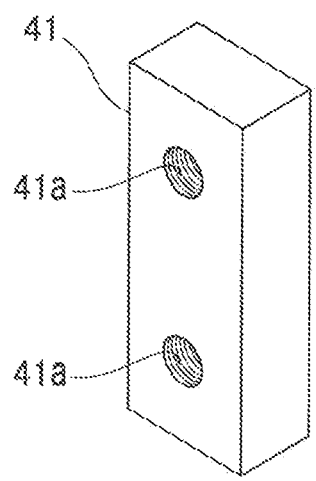
FIG. 9 is a perspective view showing a nut employed for mounting the rotor core of the power generator according to the first embodiment or each of rotor cores of power generators according to the second to fourth embodiments of the present invention on a rotor yoke.

A plurality of nut receiving holes 240a are provided in the inner peripheral portions of the core portions 240 constituting the rotor core 24a (24b), as shown in FIGS. 3, 4, 7 and 8. The plurality of nut receiving holes 240a are in the form of rectangles substantially identical in size to the nuts 41 as viewed from the axial direction. The plurality of groove portions 240b are provided to correspond to the plurality of nut receiving holes 240a respectively. The plurality of groove portions 240b are in the form of grooves connecting the nut receiving holes 240a and the inner peripheral surfaces of the core portions 240 constituting the rotor core 24a (24b) with each other. As shown in FIG. 8, the groove portions 240b are so formed that the groove width W1 thereof is smaller than the hole width W2 of the nut receiving holes 240a. The plurality of nut receiving holes 240a are arranged at substantially equiangular intervals along the circumferential direction of the rotor core 24a (24b), as shown in FIGS. 3 and 4. Further, the plurality of nut receiving holes 240a and the plurality of groove portions 240b are provided to extend along the axial direction, as shown in FIGS. 5 and 6.

The bolt receiving holes 23a are provided on portions (other than those on which the rotor wheel 22 and the rotor yoke 23 are in contact with each other) of the inner peripheral surface of the cylindrical rotor yoke 23 projecting from the rotor wheel 22 to pass through the inner and outer peripheral surfaces of the rotor yoke 23, as shown in FIGS. 5 and 6. A plurality of (two in the first embodiment) bolt receiving holes 23a are provided along the extensional direction (axial direction) of each nut 41, so that the corresponding bolts 42 can be fitted into the nut 41 inserted into the corresponding nut receiving hole 240a.

As shown in FIGS. 3, 4 and 6 to 8, first key receiving grooves 240c extending in the axial direction are formed in the inner peripheral surfaces of the core portions 240 constituting the rotor core 24a (24b). Further, second key receiving grooves 23b are formed in the outer peripheral surface of the rotor yoke 23, to correspond to the first key receiving grooves 240c. Key members 43 consisting of parallel keys or the like are inserted into a plurality of key receiving holes 50 formed by the first and second key receiving grooves 240c and 23b. The plurality of key receiving holes 50 are arranged on portions where the inner peripheral portion of the rotor core 24a (24b) and the outer peripheral portion of the rotor yoke 23 are in contact with each other at substantially equiangular intervals (see FIG. 2) along the circumferential direction. More specifically, the key receiving holes 50 are arranged in the vicinity of central portions of the inner peripheral portions of the core portions 240 constituting the rotor core 24a (24b) in a direction along the circumferential direction.

A procedure of assembling the rotor 20 of the power generator 1 according to the first embodiment is now described with reference to FIGS. 2 to 11.

First, the shaft 21 is inserted into the shaft receiving hole 22a of the discoidal rotor wheel 22 and the cylindrical rotor yoke 23 is mounted on the outer peripheral portion of the rotor wheel 22, as shown in FIGS. 2, 5 and 6.

Then, the rotor core 24 (rotor cores 24a and 24b) consisting of the plurality of core portions 240 is mounted on the outer peripheral surface of the rotor yoke 23, as shown in FIGS. 2 to 4 and 7. More specifically, the plurality of substantially arcuate core portions 240 (see FIG. 8) are arranged on the outer peripheral surface of the cylindrical rotor yoke 23 in a circumferentially combined manner, thereby constituting the two cylindrical rotor cores 24a and 24b having the inner peripheral surfaces in contact with the outer peripheral surface of the rotor yoke 23.

At this time, the rotor cores 24a and 24b are so formed that the permanent magnets 30 and 31 embedded in the rotor cores 24a and 24b respectively have polarities different from each other on the outer peripheral sides. More specifically, the rotor cores 24a and 24b are so formed that the north poles are provided on the outer peripheral sides of the permanent magnets 30 embedded in the rotor core 24a while the south poles are provided on the outer peripheral sides of the permanent magnets 31 embedded in the rotor core 24b.

At this time, further, the rotor cores 24a and 24b are arranged on the outer peripheral surface of the rotor yoke 23 to overlap with each other in the axial direction in the state deviating from each other by the prescribed angle (180° in electrical angle) in the direction of rotation. More specifically, the rotor cores 24a and 24b are so arranged on the outer peripheral surface of the rotor yoke 23 that the first magnetic pole portions 241a of the rotor core 24a and the second magnetic pole portions 242b of the rotor core 24b correspond to each other while the second magnetic pole portions 242a of the rotor core 24a and the first magnetic pole portions 241b of the rotor core 24b correspond to each other.

Then, the groove portions 240b of the core portions 240 constituting the rotor core 24a (24b) and the bolt receiving holes 23a of the rotor yoke 23 are aligned with each other. Further, the first key receiving grooves 240c of the core portions 240 of the rotor core 24a (24b) and the second key receiving grooves 23b of the rotor yoke 23 are aligned with each other.

Figure 10:
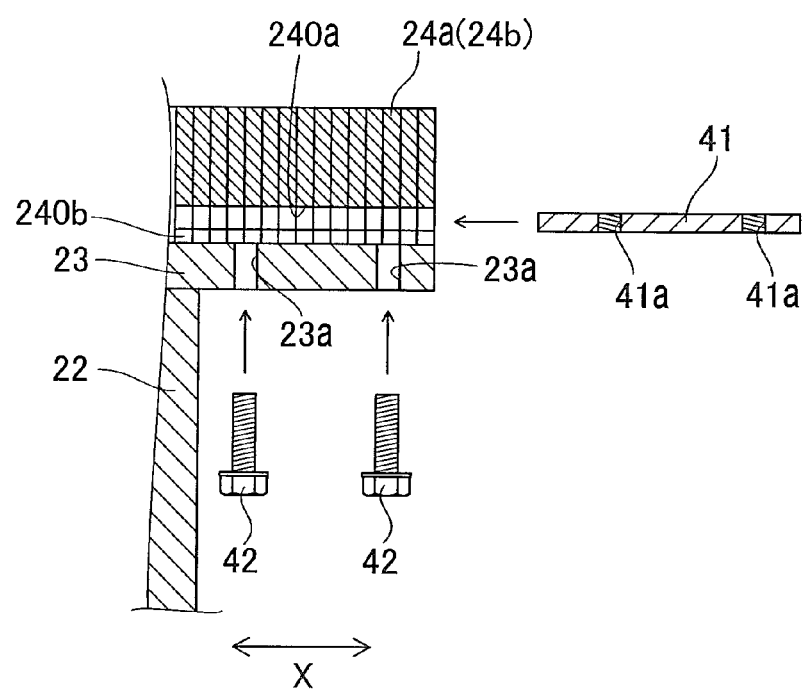
FIG. 10 is a sectional view for illustrating a procedure of fastening the rotor core and the rotor yoke of the power generator according to the first embodiment of the present invention to each other.

Then, the rotor yoke 23 and the inner peripheral portion of the rotor core 24a (24b) arranged on the outer peripheral surface thereof are fixed to each other by fastening the same with each fastening member consisting of each nut 41 and the corresponding bolts 42, as shown in FIG. 10. More specifically, each nut 41 (see FIG. 9) in the form of the rectangular parallelepiped is first inserted into the nut receiving hole 240a of the corresponding core portion 240 of the rotor core 24a (24b). Then, the bolts 42 are inserted into the bolt receiving holes 23a of the rotor yoke 23 from the inner side of the rotor yoke 23. Then, the bolts 42 are fitted into the threaded holes 41a of the nut 41 through the corresponding bolt receiving holes 23a of the rotor yoke 23 and the groove portion 240b of the corresponding core portion 240 of the rotor core 24a (24b) aligned with each other in the aforementioned manner.

Figure 11:
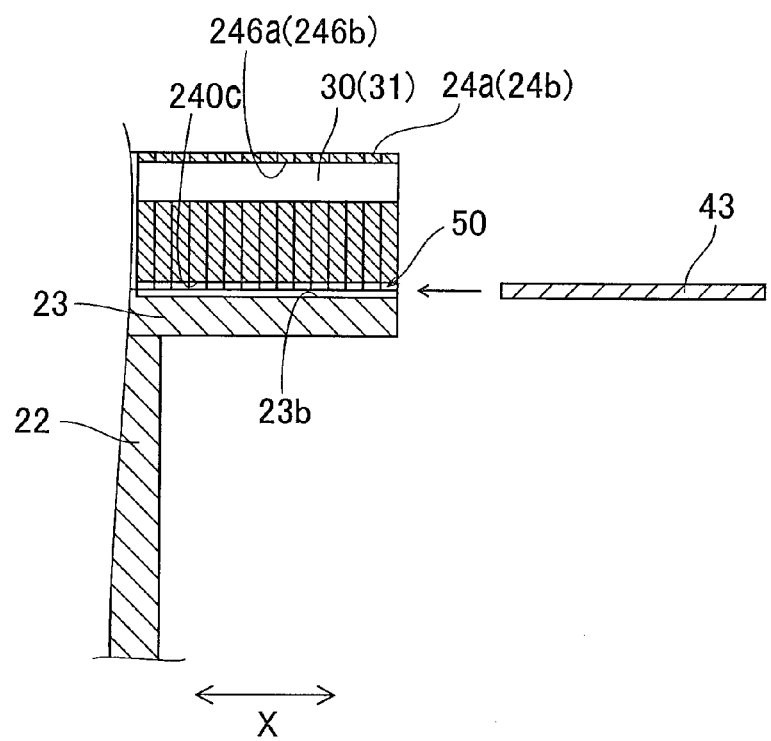
FIG. 11 is a sectional view for illustrating a procedure of fixing the rotor core and the rotor yoke of the power generator according to the first embodiment of the present invention to each other with a key member.

Finally, each key member 43 consisting of a parallel key or the like is axially inserted into the corresponding key receiving hole 50 consisting of the first key receiving groove 240c of the corresponding core portion 240 of the rotor core 24a (24b) and the corresponding second key receiving groove 23b of the rotor yoke 23 aligned with each other in the aforementioned manner, as shown in FIG. 11. Thus, the rotor 20 of the power generator 1 according to the first embodiment is assembled.

According to the first embodiment, as hereinabove described, the rotor yoke 23 and the inner peripheral portion of the rotor core 24 are so fixed (fastened) to each other with the nuts 41 and the bolts 42 that no residual stress resulting from heat generated in shrink fitting is applied to the assembled rotor 20 dissimilarly to a case of fixing the rotor core 24 and the rotor yoke 23 to each other by shrink fitting in order to assemble the rotor 20, whereby durability of the rotor 20 can be increased. Further, the thicknesses of the magnet covering portions 243 and the coupling portions 245 can be reduced due to the improvement in the durability of the rotor 20. When the thicknesses of the magnet covering portions 243 and the coupling portions 245 are reduced, magnetic flux density in the gap between the outer peripheral portion of the rotor core 24 and the inner peripheral portion of the stator core 11 is improved, and leakage flux through the coupling portions 245 can be reduced. Further, no heating equipment is required for shrink fitting, whereby the rotor 20 can be assembled by a simple method. In general, high durability is required to a wind power generation system used over a long period. In general, further, a rotor used for a power generator of the wind power generation system is hard to assemble due to a large size thereof. According to the first embodiment, the durability of the rotor 20 can be increased and the rotor 20 can be assembled by a simple method, whereby the power generator 1 suitable to the wind power generation system 100 can be provided.

According to the first embodiment, as hereinabove described, the rotor core 24 is formed to be dividable in the circumferential direction, to include the plurality of core portions 240. Thus, the number of materials wasted when manufacturing the rotor core 24 can be reduced as compared with a case of forming the rotor core 24 by arcuately punched steel plates, whereby the yield of the materials for the rotor core 24 can be improved. In general, the materials for the rotor core 24 used for the power generator 1 of the wind power generation system 100 are easily wasted due to the large size of the rotor core 24. According to the first embodiment, however, the yield of the materials for the rotor core 24 can be improved, whereby the rotor core 24 suitable to the wind power generation system 100 can be provided.

According to the first embodiment, as hereinabove described, the nuts 41 and the bolts 42 are arranged on the boundaries between the plurality of core portions 240. Thus, the inner peripheral portions of the boundaries between the plurality of core portions 240 can be pressed against the outer peripheral surface of the rotor yoke 23 with the nuts 41 and the bolts 42. Consequently, the outer peripheral portion of the rotor core 24 can be inhibited from causing steps on the boundaries between the plurality of core portions 240 when the rotor yoke 23 and the rotor core 24 are fixed to each other.

According to the first embodiment, as hereinabove described, the rotor core 24 is in the form of the cylinder having the inner peripheral surface arranged on the outer peripheral surface of the rotor yoke 23, and the plurality of core portions 240 constituting the rotor core 24 are formed to have the substantially identical shapes obtained by dividing the cylindrical shape at the substantially equiangular intervals. Thus, the manufacturing yield of the core portions 240 can be improved, dissimilarly to a case of forming the plurality of core portions 240 in different shapes.

According to the first embodiment, as hereinabove described, the rotor core 24 (rotor cores 24a and 24b) is formed by alternately circumferentially arranging the plurality of first magnetic pole portions 241a and 241b having the permanent magnets 30 (31) and the plurality of second magnetic pole portions 242a and 242b having no permanent magnets 30 (31) one by one. Further, the nuts 41 and the bolts 42 are arranged on the portions of the inner peripheral portion of the rotor core 24 corresponding to the second magnetic pole portions 242a and 242b. Thus, the nuts 41 and the bolts 42 are arranged on portions where the distribution of magnetic flux generated from the permanent magnets 30 (31) is most coarsened, whereby the nuts 41 and the bolts 42 can be inhibited from exerting bad magnetic influence on the power generator 1.

According to the first embodiment, as hereinabove described, each nut 41 is formed to extend toward the rotor core 24 in the axial direction and to include the plurality of threaded holes 41a along the axial direction. Further, the plurality of bolts 42 are arranged along the extensional direction of the nut 41, and fitted into the plurality of threaded holes 41a of the nut 41. Thus, the rotor core 24 and the rotor yoke 23 can be easily fastened to each other along the axial direction with each nut 41 extending in the axial direction and the plurality of bolts 42 fitted into the plurality of threaded holes 41a provided on the nut 41 along the axial direction, and the number (number of components) of the nuts 41 can be reduced.

According to the first embodiment, as hereinabove described, the nut receiving holes 240a receiving the nuts 41 and the groove portions 240b connecting the nut receiving holes 240a and the inner peripheral surface of the rotor core 24 with each other are provided on the inner peripheral portion of the rotor core 24. The nut receiving holes 240a and the groove portions 240b are provided to extend in the axial direction of the rotor core 24, while the power generator 1 is so formed that the groove width W1 of the groove portions 240b is smaller than the hole width W2 of the nut receiving holes 240a. Further, the plurality of bolts 42 are fitted into the plurality of threaded holes 41a of each nut 41 inserted into the corresponding nut receiving hole 240a through the corresponding groove portion 240b extending in the axial direction. Thus, the groove width W1 of the groove portions 240b is so rendered smaller than the hole width W2 of the nut receiving holes 240a that the nuts 41 inserted into the nut receiving holes 240a can be inhibited from moving (falling) toward the inner peripheral portion (toward the groove portions 240b) of the rotor core 24. Further, the groove portions 240b can be employed as guides for inserting the bolts 42 toward the nuts 41 inserted into the nut receiving holes 240b, whereby the bolts 41 can be easily fitted into the threaded holes 41a of the nuts 41.

According to the first embodiment, as hereinabove described, the rotor 20 is provided with the discoidal rotor wheel 22 surrounding the shaft 21 and in contact with the inner peripheral surface of the rotor yoke 23. The rotor yoke 23 is in the form of the cylinder having the axial length L larger than the thickness t of the discoidal rotor wheel 22 (see FIGS. 5 and 6), while the plurality of bolt receiving holes 23a are formed on the portions of the peripheral surface of the cylindrical rotor yoke 23 projecting from the rotor wheel 22. The plurality of bolts 42 are fitted into the plurality of threaded holes 41a of each nut 41 arranged to extend toward the rotor core 24 through the plurality of bolt receiving holes 23a in the axial direction. Thus, the plurality of bolts 42 can be easily inserted toward the rotor core 24 from the inner side of the rotor yoke 23 through the plurality of bolt receiving holes 23a formed on the portions of the inner peripheral surface of the cylindrical rotor yoke 23 projecting from the rotor wheel 22.

According to the first embodiment, as hereinabove described, the first key receiving grooves 240c extending in the axial direction are formed on the inner peripheral portion of the rotor core 24 while the second key receiving grooves 23c are formed on the outer peripheral surface of the rotor yoke 23 to correspond to the first key receiving grooves 240c of the rotor core 24. Further, the key members 43 are inserted into the key receiving holes 50 consisting of the first and second key receiving grooves 240c and 23c. Thus, the key members 43 can inhibit the rotor yoke 23 from idling inside the rotor core 24.

According to the first embodiment, as hereinabove described, the first magnetic pole portions 241a and 241b are formed to include the magnet covering portions 243 covering the outer peripheral sides of the permanent magnets 30 (31), the voids 244 exposing the end surfaces of the permanent magnets 30 (31) and the coupling portions 245 provided to correspond to the voids 244 for coupling the magnet covering portions 243 and the second magnetic pole portions 242a (242b) adjacent to the first magnetic pole portions 241a (241b) to each other along the outer periphery of the rotor core 24 (rotor cores 24a and 24b). Thus, the magnet covering portions 243 can inhibit the permanent magnets 30 (31) from coming off toward the outer peripheral sides due to centrifugal force resulting from rotation of the rotor core 24. Further, the coupling portions 245 are provided along the outer periphery of the rotor core 24 (along the direction of stress (tensile stress and compressive stress) applied in rotation of the rotor core 24), whereby tensile stress and compressive stress are applied to the coupling portions 245 while bending stress easily causing breakage as compared with the tensile stress and the compressive stress is hardly applied thereto in rotation of the rotor core 24. Thus, the coupling portions 245 can be prevented from breakage resulting from bending stress, whereby the durability of the rotor core 24 can be increased. In addition, the voids 244 exposing the end surfaces of the permanent magnets 30 (31) are so provided that magnetic paths connecting the outer peripheral surfaces and the inner peripheral surfaces of end portions of the permanent magnets 30 (31) with each other can be lengthened, and magnetic resistance thereof can be increased. Thus, leakage flux from the outer peripheral surfaces to the inner peripheral surfaces (or vice versa) of the end portions of the permanent magnets 30 (31) can be reduced.

According to the first embodiment, as hereinabove described, the radial thickness t1 (see FIGS. 3 and 4) of the coupling portions 245 is rendered smaller than the radial thickness t2 (see FIGS. 3 and 4) of the central portions of the magnet covering portions 243. Thus, the thickness of the coupling portions 255 can be so reduced that the sectional areas of the coupling portions 245 forming paths of leakage flux can be reduced as compared with a case of substantially equalizing the thicknesses of the coupling portions 255 and the magnet covering portions 243 to each other, whereby leakage flux from the end portions of the permanent magnets 30 (31) can be further reduced.

According to the first embodiment, as hereinabove described, the corners 244a of the portions of the voids 244 corresponding to the coupling portions 245 closer to the second magnetic pole portions 242a (242b) are formed to have the arcuate sectional shapes. Thus, the radial thickness of the portions of the coupling portions 245 closer to the second magnetic pole portions 242a (242b) can be increased dissimilarly to a case of forming the corners 244a to have rectangular sectional shapes, whereby the durability of the rotor core 24 can be further increased.

According to the first embodiment, as hereinabove described, the hole portions 246a (246b) for mounting the permanent magnets 30 (31) are provided to be continuous with the voids 244 of the first magnetic pole portions 241a (241b), and the engaging portions 247 engaging with the permanent magnets 30 (31) are provided on the hole portions 246a (246b). Thus, the permanent magnets 30 (31) can be strongly fixed to the hole portions 246a (246b) by engaging the permanent magnets 30 (31) and the engaging portions 247 of the hole portions 246a (246b) with each other.

According to the first embodiment, as hereinabove described, the inclined portions 30a are so formed on the end surfaces of the permanent magnets 30 (31) that the circumferential width of the permanent magnets 30 (31) is gradually reduced from the inner peripheral sides toward the outer peripheral sides, and the engaging portions 247 are formed to engage with the inclined portions 30a of the permanent magnets 30 (31) by coming into contact with the same. Thus, the permanent magnets 30 (31) can be rendered hardly disengageable from the engaging portions 247, whereby the permanent magnets 30 (31) can be more strongly fixed to the hole portions 246a (246b).

According to the first embodiment, as hereinabove described, the outer periphery-side surfaces of the magnet covering portions 243 are formed to have the convex shapes provided with the top portions corresponding to the central portions of the permanent magnets 30 (31) as viewed from the axial direction. Thus, the distribution of the magnetic flux density in the gap between the magnet covering portions 243 (outer peripheral portion of the rotor core 24) and the inner peripheral portion of the stator core 11 can be rendered sinusoidal, whereby magnetic properties of the power generator 1 can be improved.

According to the first embodiment, as hereinabove described, the rotor core 24 is constituted of the rotor cores 24a and 24b arranged to overlap with each other in the axial direction, and the permanent magnets 30 and 31 of the rotor cores 24a and 24b are magnetized to have the polarities different from each other on the outer peripheral sides. Further, the rotor cores 24a and 24b are arranged to overlap with each other in the axial direction in the state deviating from each other by the prescribed angle (180° in electrical angle) in the direction of rotation so that the first magnetic pole portions 241a of the rotor core 24a and the second magnetic pole portions 242b of the rotor core 24b correspond to each other and the second magnetic pole portions 242a of the rotor core 24a and the first magnetic pole portions 241b of the rotor core 24b correspond to each other. Thus, the permanent magnets 30 and 31 magnetized to have the polarities different from each other on the outer peripheral sides are alternately circumferentially arranged one by one on the rotor core 24 consisting of the rotor cores 24a and 24b as viewed from the axial direction, whereby the rotor core 24 can generate magnetic flux in a balanced manner.

According to the first embodiment, as hereinabove described, the magnet covering portions 243 are constituted of a plurality of electromagnetic steel plates stacked to overlap with each other in the axial direction. Thus, magnetic flux generated by armature reaction flows along the extensional direction (direction intersecting with the axial direction) of the electromagnetic steel plates constituting the magnet covering portions 243, whereby the sectional areas of portions of the magnet covering portions 243 where the magnetic flux generated by armature reaction flows can be reduced. Consequently, eddy current loss caused in the magnet covering portions 243 can be reduced.

According to the first embodiment, as hereinabove described, the boundaries between the plurality of core portions 240 are arranged on the portions corresponding to the second magnetic pole portions 242a (242b) of the rotor core 24a (24b). Thus, the rotor core 24a (24b) is divided on the second magnetic pole portions 242a (242b) provided with no permanent magnets 30 (31), whereby the rotor core 24a (24b) can be prevented from reduction of the magnetic properties. Consequently, the power generator 1 can be prevented from reduction of power generation efficiency. Further, the rotor core 24a (24b) can be more prevented from reduction of the magnetic properties as compared with a case of dividing the rotor core 24a (24b) on the first magnetic pole portions 241a (241b) provided with the hole portions 246a (246b) for mounting the permanent magnets 30 (31). In addition, assembling accuracy of the rotor core 24a (24b) can be further improved.

According to the first embodiment, as hereinabove described, the boundaries between the plurality of core portions 240 are arranged on the magnetic boundaries (see the straight line 11 in FIG. 7) of the second magnetic pole portions 242a (242b) of the rotor core 24a (24b). Thus, the rotor core 24a (24b) is divided on least magnetically influenced portions of the second magnetic pole portions 242a (242b), whereby the rotor core 24a (24b) can be more prevented from reduction of the magnetic properties. Consequently, the power generator 1 can be more prevented from reduction of the power generation efficiency.

According to the first embodiment, as hereinabove described, the boundaries between the plurality of core portions 240 are arranged every four second magnetic pole portions 242a (242b). Thus, the number of division of the rotor core 24a (24b) can be reduced as compared with a case of dividing the rotor core 24a (24b) on all second magnetic pole portions 242a (242b), whereby the rotor core 24a (24b) can be prevented from reduction of the magnetic properties resulting from a large number of division of the rotor core 24a (24b).

(Second Embodiment)

The structure of a rotor 20a of a power generator 1a according to a second embodiment is now described with reference to FIGS. 12 and 13. According to the second embodiment, permanent magnets 32 (33) are formed to have substantially rectangular sections as viewed from an axial direction, dissimilarly to the aforementioned first embodiment in which the permanent magnets 30 (31) are formed to have the substantially trapezoidal sections as viewed from the axial direction. The power generator 1a is an example of the "rotating electric machine" in the present invention.

Figure 12:
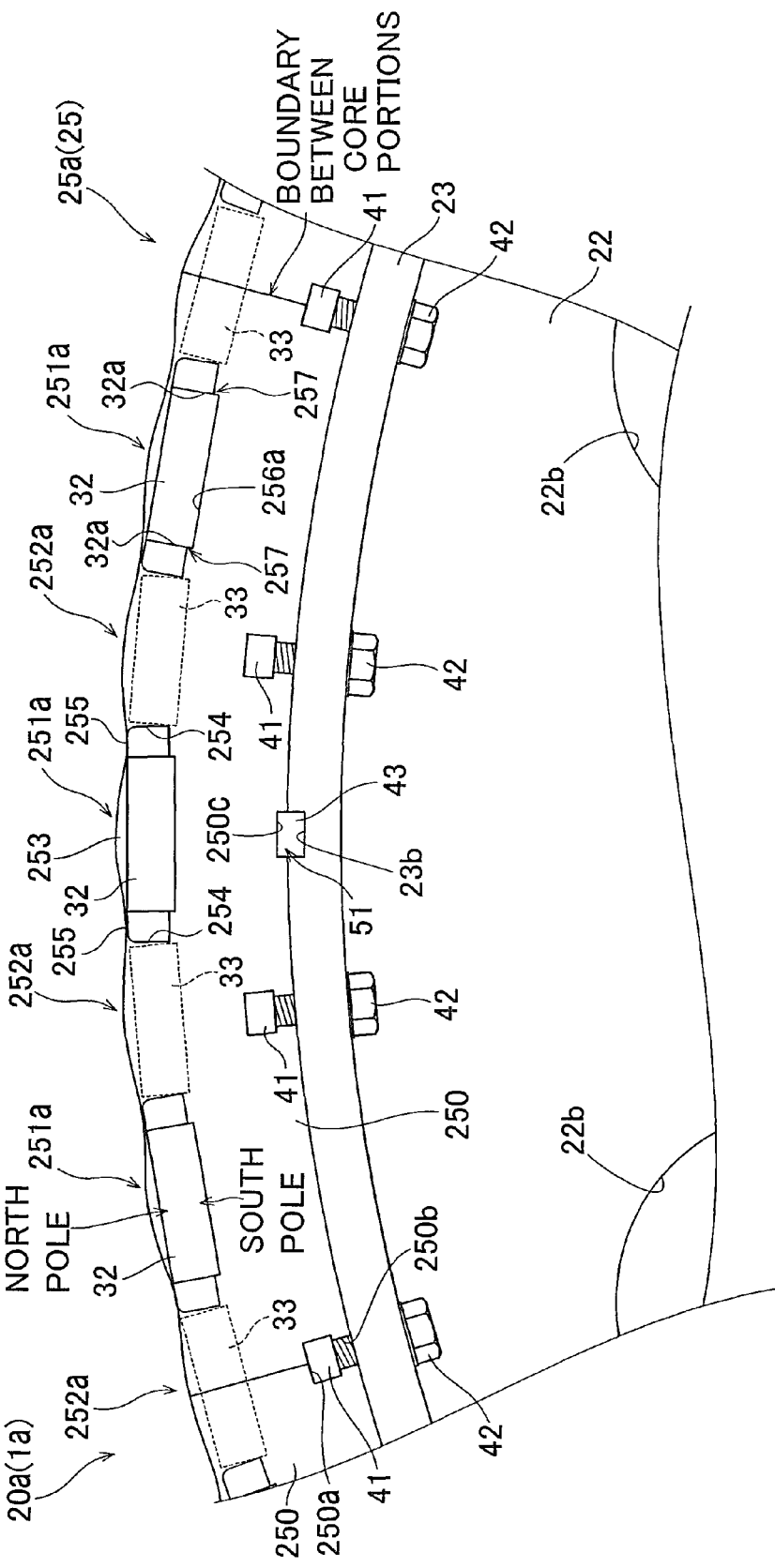
FIG. 12 is an enlarged view of a rotor of the power generator according to the second embodiment of the present invention as viewed from one side in an axial direction.
Figure 13:
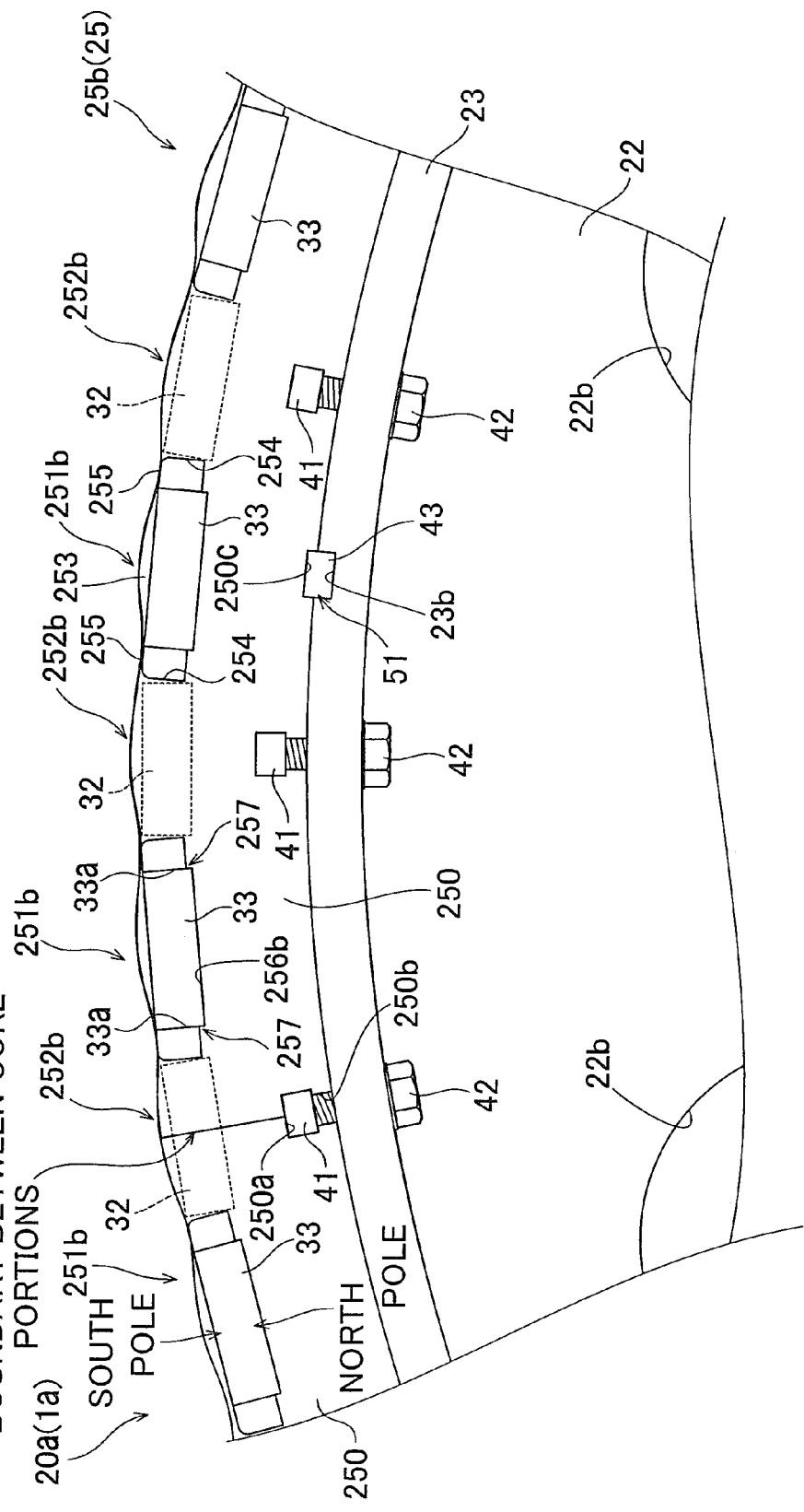
FIG. 13 is an enlarged view of the rotor shown in FIG. 12 as viewed from another side in the axial direction.

As shown in FIGS. 12 and 13, a rotor core 25 of the rotor 20a according to the second embodiment is formed by arranging rotor cores 25a and 25b to overlap with each other in the axial direction in a state deviating from each other by a prescribed angle (180° in electrical angle) in the direction of rotation.

The rotor core 25a (25b) is formed to be dividable in the circumferential direction, to include a plurality of core portions 250. The plurality of core portions 250 are provided with nut receiving holes 250a for receiving nuts 41, groove portions 250b for receiving bolts 42 and first key receiving grooves 250c constituting key receiving holes 51 for receiving key members 43.

The rotor core 25a (25b) is formed by alternately circumferentially arranging a plurality of first magnetic pole portions 251a (251b) having the permanent magnets 32 (33) and a plurality of second magnetic pole portions 252a (252b) having no permanent magnets 32 (33) one by one. As shown in FIG. 12, the permanent magnets 32 so magnetized that the north poles are provided on the outer peripheral sides are embedded in hole portions 256a, described later, of the first magnetic pole portions 251a through an adhesive or the like. As shown in FIG. 13, the permanent magnets 33 so magnetized that the south poles are provided on the outer peripheral sides are embedded in hole portions 256b, described later, of the first magnetic pole portions 251b through an adhesive or the like. In other words, each of the rotor cores 25a and 25b is formed to have an IPM structure and a consequent pole structure.

As shown in FIGS. 12 and 13, the first magnetic pole portions 251a (251b) are formed to include magnet covering portions 253 covering the outer peripheral sides of the permanent magnet 32s (33), pairs of voids 2554 exposing both end surfaces of the permanent magnets 32 (33) and pairs of coupling portions 255 provided to correspond to the pairs of voids 254 respectively. Further, the first magnetic pole portions 251a (251b) are provided with the hole portions 256a (256b) for mounting the permanent magnets 32 (33), to be continuous with the voids 254.

According to the second embodiment, the permanent magnets 32 (33) are formed to have the rectangular sections as viewed from the axial direction. In other words, parallel portions 32a (33a) formed to be substantially parallel to each other are provided on both end surfaces of the permanent magnets 32 (33).

According to the second embodiment, the hole portions 256a (256b) of the first magnetic pole portions 251a (251b) of the rotor core 25a (25b) are provided with pairs of engaging portions 257 engaging with portions of the parallel portions 32a (33a) of the permanent magnets 32 (33) closer to the inner peripheral side of the rotor core 25a (25b) by coming into contact with the same. The rotor 20a is so formed that circumferential widths of spaces between the pairs of engaging portions 257 are substantially equal to each other on the inner and outer peripheral sides of the rotor core 25a (25b).

The remaining structure of the second embodiment is similar to that of the aforementioned first embodiment.

According to the second embodiment, as hereinabove described, the permanent magnets 32 (33) are formed to have the substantially rectangular sections so that both end surfaces thereof are substantially parallel to each other. Thus, the permanent magnets 32 (33) can be easily manufactured, dissimilarly to a case of forming the permanent magnets 32 (33) in shapes (such as sectorial shapes, for example) other than the substantially rectangular shapes.

The remaining effects of the second embodiment are similar to those of the aforementioned first embodiment.

(Third Embodiment)

The structure of a rotor 20b of a power generator 1b according to a third embodiment is now described with reference to FIGS. 14 to 17. According to the third embodiment, outer periphery-side surfaces of permanent magnets 30 (31) are exposed, dissimilarly to the aforementioned first embodiment in which the outer periphery-side surfaces of the permanent magnets 30 (31) are covered with the magnet covering portions 243. The power generator 1b is an example of the "rotating electric machine" in the present invention.

As shown in FIGS. 14 to 17, a rotor core 26 of the rotor 20b according to the third embodiment is formed by arranging rotor cores 26a and 26b to overlap with each other in an axial direction in a state deviating from each other by a prescribed angle (180° in electrical angle) in the direction of rotation.

Figure 14:
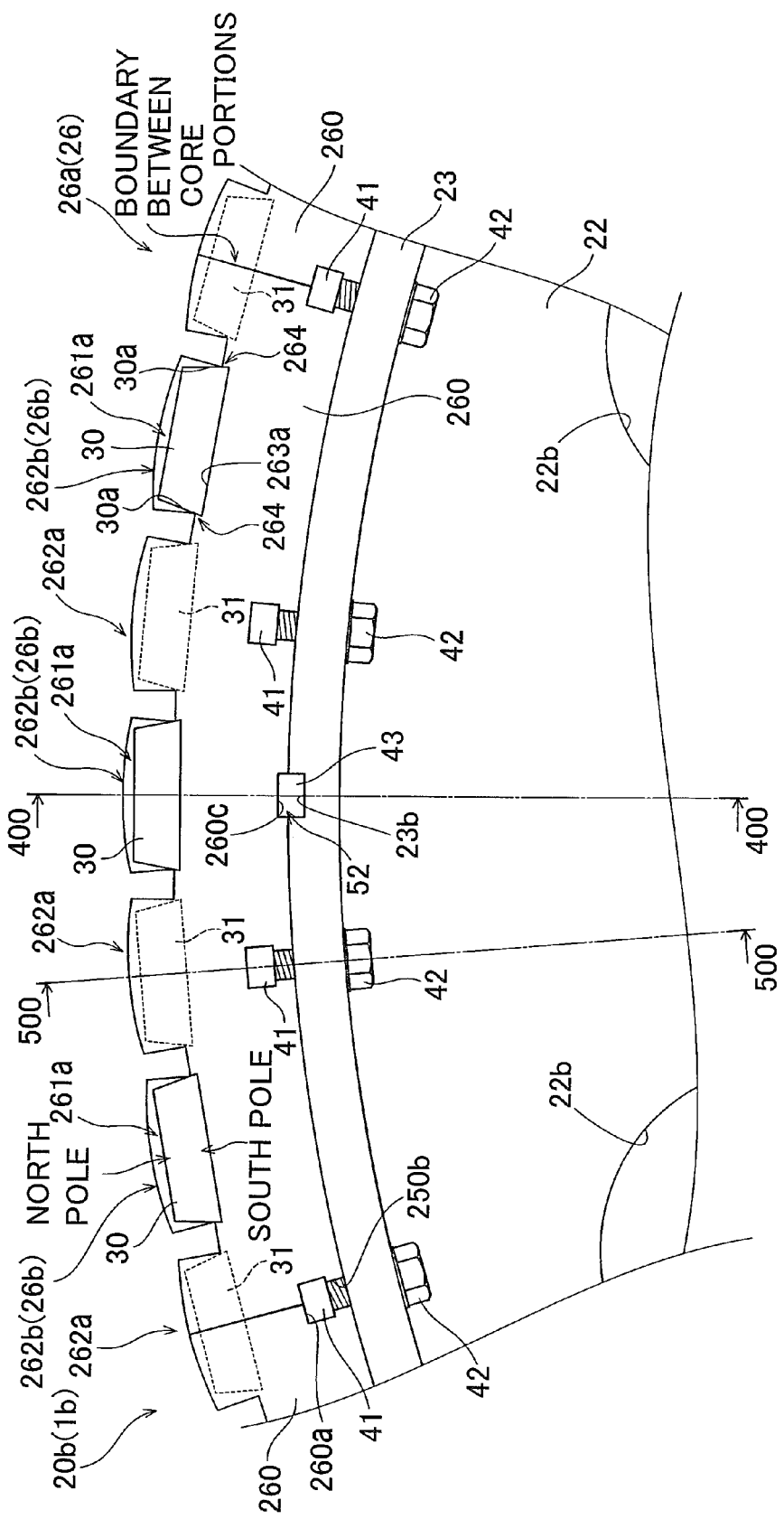
FIG. 14 is an enlarged view of a rotor of the power generator according to the third embodiment of the present invention as viewed from one side in an axial direction.
Figure 15:
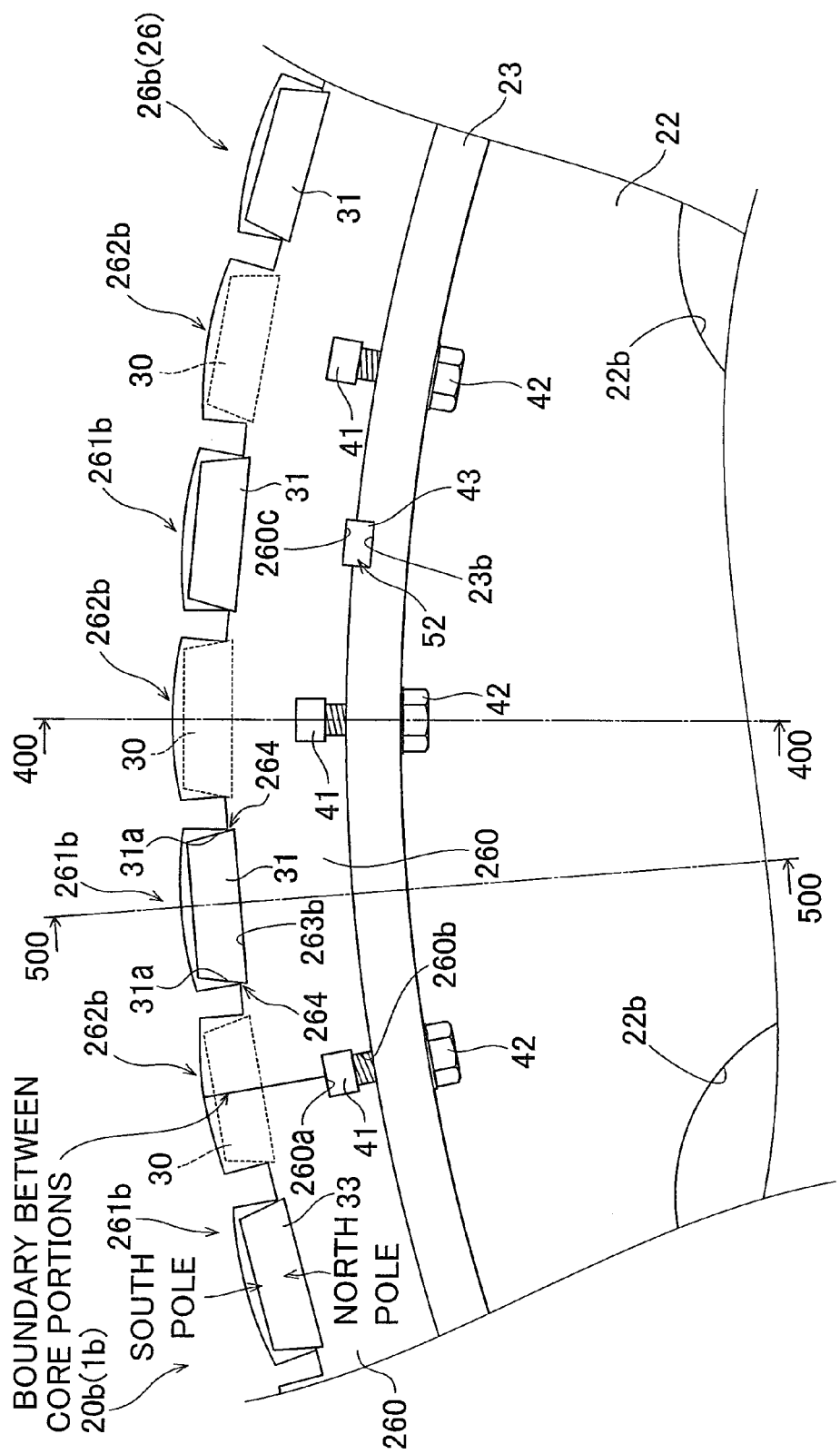
FIG. 15 is an enlarged view of the rotor shown in FIG. 14 as viewed from another side in the axial direction.
Figure 16:
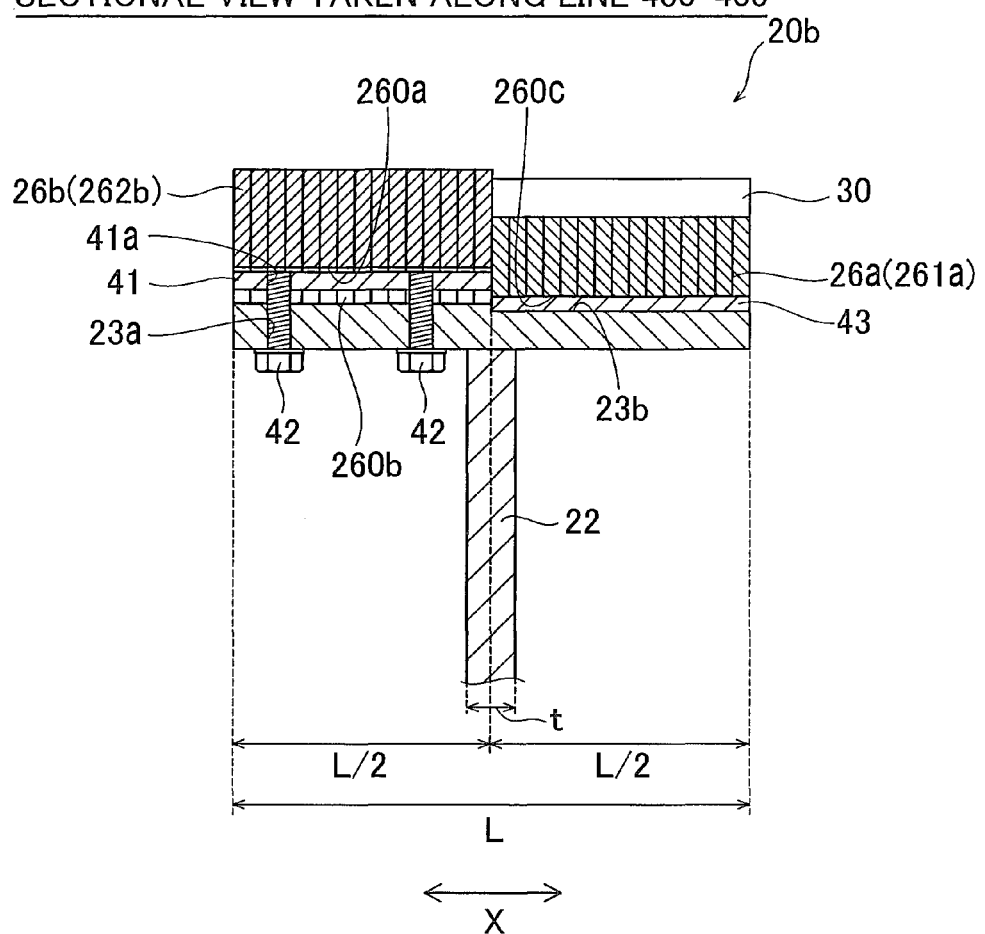
FIG. 16 is a sectional view taken along the lines 400-400 in FIGS. 14 and 15.
Figure 17:
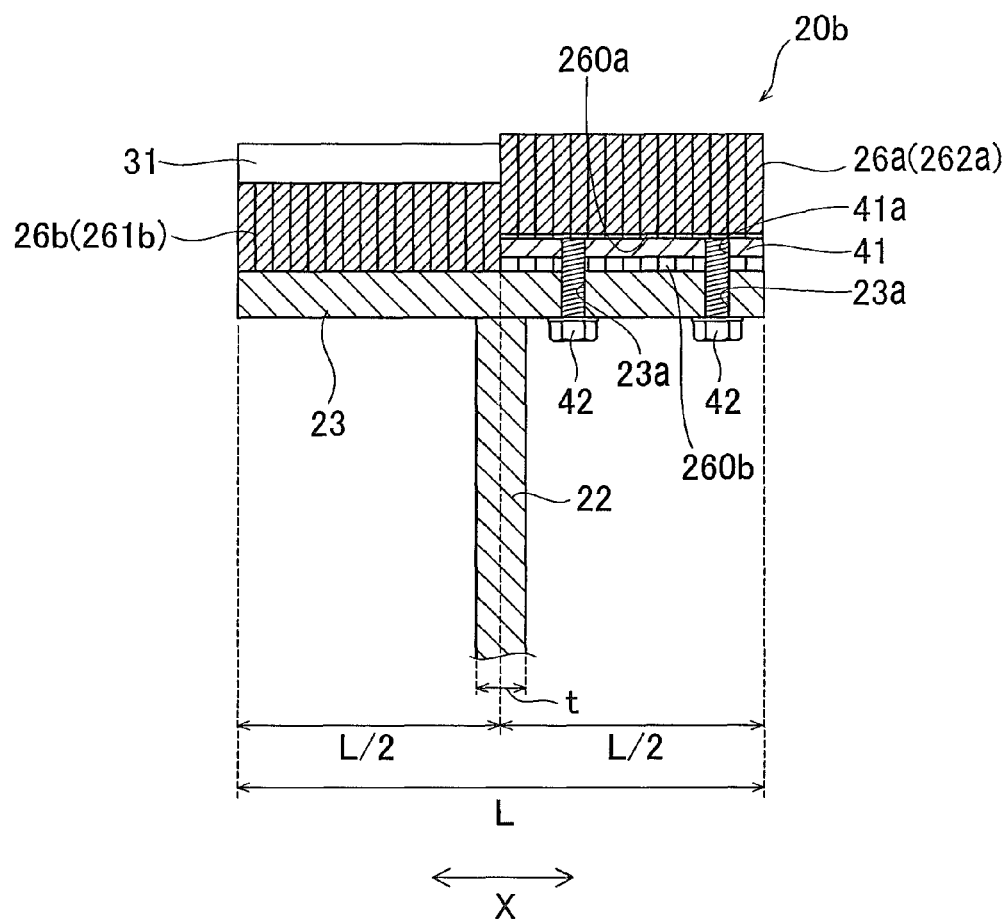
FIG. 17 is a sectional view taken along the lines 500-500 in FIGS. 14 and 15.

As shown in FIGS. 14 and 15, the rotor core 26a (26b) is formed to be dividable in the circumferential direction, to include a plurality of core portions 260. The plurality of core portions 260 are provided with nut receiving holes 260a for receiving nuts 41, groove portions 260b for receiving bolts 42 and first key receiving grooves 260c constituting key receiving holes 52 for receiving key members 43.

As shown in FIG. 14, the rotor core 26a is formed by alternately circumferentially arranging a plurality of first magnetic pole portions 261a having the permanent magnets 30 so magnetized that the north poles are provided on the outer peripheral sides and a plurality of second magnetic pole portions 242a having no permanent magnets 30 one by one. As shown in FIG. 15, the rotor core 26b is formed by alternately circumferentially arranging a plurality of first magnetic pole portions 261v having the permanent magnets 31 so magnetized that the south poles are provided on the outer peripheral sides and a plurality of second magnetic pole portions 262a having no permanent magnets 31 one by one. In other words, each of the rotor cores 26a and 26b has a consequent pole structure.

According to the third embodiment, the permanent magnets 30 (31) are mounted on the first magnetic pole portions 261a (261b) through an adhesive or the like, so that outer periphery-side surfaces thereof are exposed. The structure of the rotor core 26a (26b) so mounted that the outer periphery-side surfaces of the permanent magnets 30 (31) are exposed is generally referred to as an SPM (Surface Permanent Magnet) structure. Therefore, each of the rotor cores 26a and 26b according to the third embodiment has an SPM structure and a consequent pole structure.

According to the third embodiment, the first magnetic pole portions 261a (261b) are provided with magnet mounting portions 263a (263b) for mounting the permanent magnets 30 (31) thereon, as shown in FIGS. 14 and 15. The magnet mounting portions 263a (263b) are concaved toward the inner peripheral side of the rotor core 26a (26b). The magnet mounting portions 263a (263b) are provided with pairs of engaging portions 264 engaging with portions of inclined portions 30a (31a) of the permanent magnets 30 (31) closer to the inner peripheral side of the rotor core 26a (26b) by coming into contact with the same.

According to the third embodiment, the second magnetic pole portions 262a (262b) are convexed toward the outer peripheral side of the rotor core 26a (26b). As shown in FIG. 14, the second magnetic pole portions 262b of the rotor core 26b are formed to project outward beyond the permanent magnets 30 of the first magnetic pole portions 261a of the rotor core 26a as viewed one side in an axial direction. Similarly, the second magnetic pole portions 262a of the rotor core 26a are formed to project outward beyond the permanent magnets 31 of the first magnetic pole portions 261b of the rotor core 26b as viewed from another side in the axial direction, as shown in FIG. 15.

In the rotor core 26 according to the third embodiment having the SPM structure, the rotor core 26a (26b) may be provided with no hole portions (hole portions 246a (246b) in the aforementioned first embodiment) (see FIGS. 3 and 4) for mounting the permanent magnets 30 (31), dissimilarly to the rotor core 24 according to the aforementioned first embodiment having the IPM structure. In other words, the rotor 20b may be provided with no portions (magnet covering portions 243 (see FIGS. 3 and 4) in the aforementioned first embodiment) covering the outer periphery-side surfaces of the permanent magnets 30 (31) when manufacturing the rotor core 26a (26b), whereby the rotor core 26a (26b) can be easily manufactured.

The remaining structure of the third embodiment is similar to that of the aforementioned first embodiment.

The remaining effects of the third embodiment are also similar to those of the aforementioned first embodiment.

(Fourth Embodiment)

The structure of a rotor 20c of a power generator 1c according to a fourth embodiment is now described with reference to FIGS. 18 and 19. According to the fourth embodiment, boundaries between a plurality of core portions 270 are arranged on portions corresponding to first magnetic pole portions 271a (271b) of a rotor core 27a (27b), dissimilarly to the aforementioned first embodiment in which the boundaries between the plurality of core portions 240 are arranged on the portions corresponding to the second magnetic pole portions 242a (242b) of the rotor core 24a (24b). The power generator 1c is an example of the "rotating electric machine" in the present invention.

Figure 18:
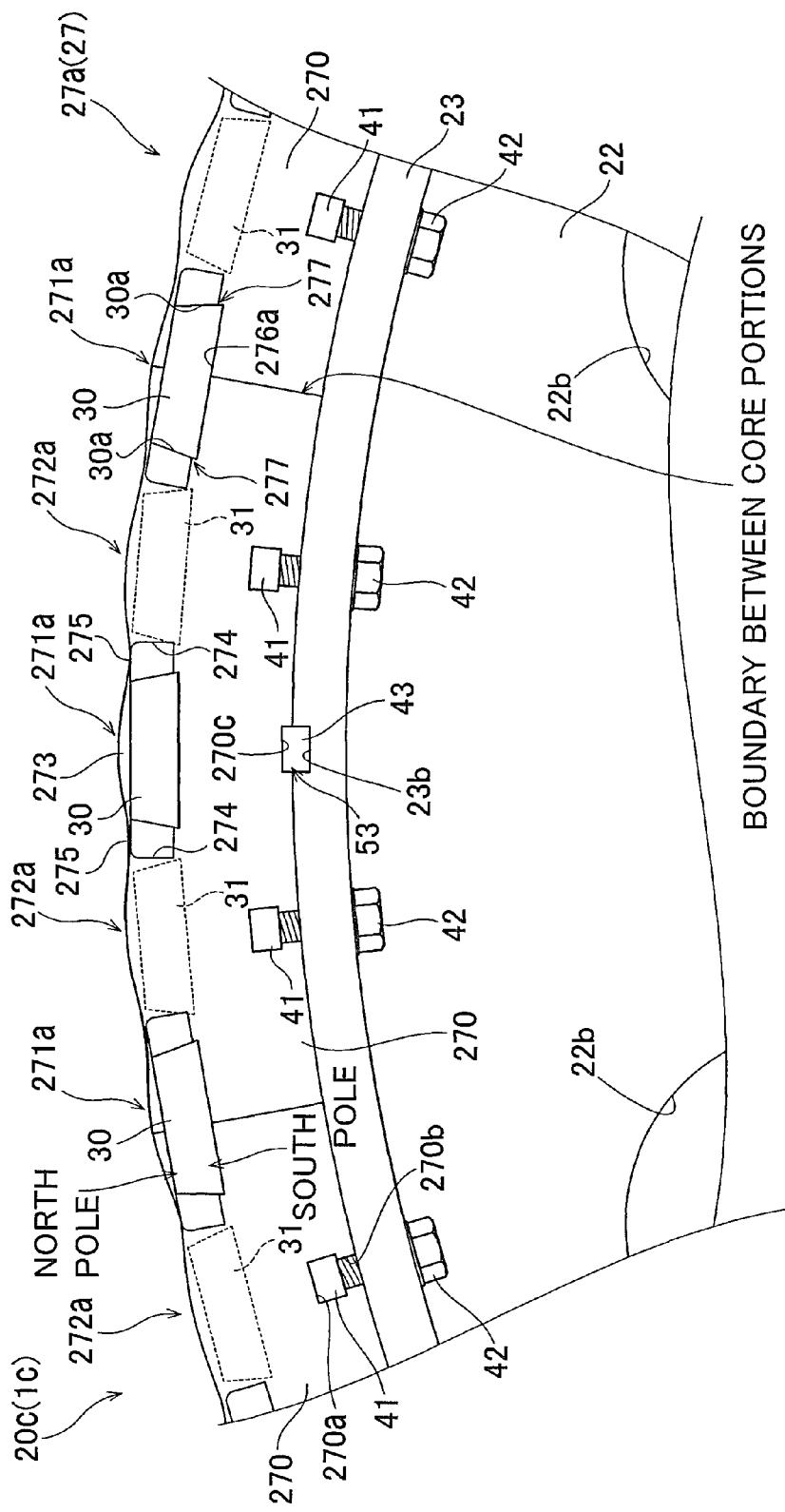
FIG. 18 is an enlarged view of a rotor of the power generator according to the fourth embodiment of the present invention as viewed from one side in an axial direction.
Figure 19:
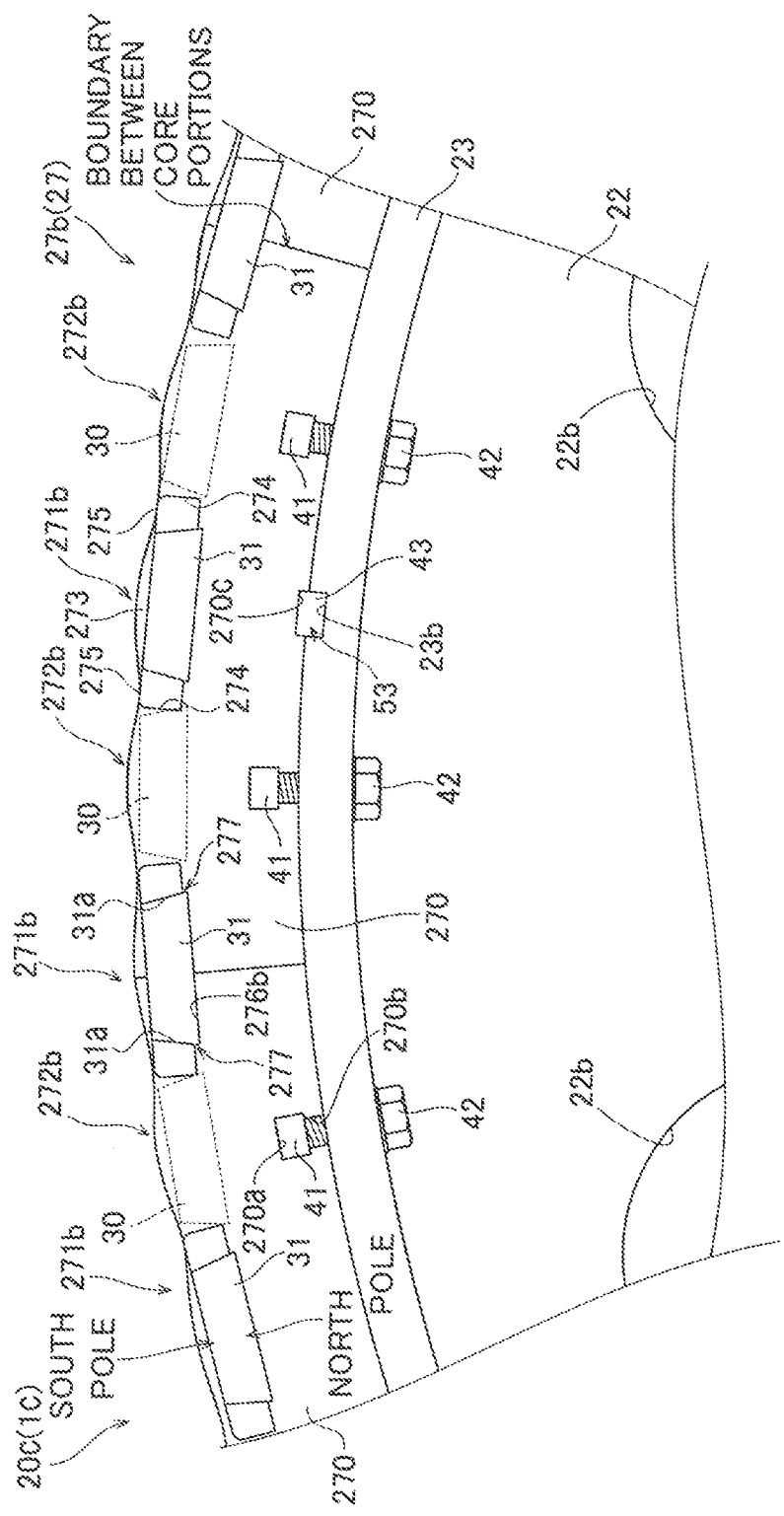
FIG. 19 is an enlarged view of the rotor shown in FIG. 18 as viewed from another side in the axial direction.

As shown in FIGS. 18 and 19, the rotor core 27 of the rotor 20c according to the fourth embodiment is formed by arranging rotor cores 27a and 27b to overlap with each other in an axial direction in a state deviating from each other by a prescribed angle (180° in electrical angle) in the direction of rotation.

The rotor core 27a (27b) is formed by alternately circumferentially arranging a plurality of first magnetic pole portions 271a (271b) having permanent magnets 30 (31) and a plurality of second magnetic pole portions 272a (272b) having no permanent magnets 30 (31) one by one. As shown in FIG. 18, the permanent magnets 30 so magnetized that the north poles are provided on the outer peripheral sides are embedded in hole portions 276a, described later, of the first magnetic pole portions 271a through an adhesive or the like. As shown in FIG. 19, the permanent magnets 31 so magnetized that the south poles are provided on the outer peripheral sides are embedded in hole portions 276b, described later, of the first magnetic pole portions 271b through an adhesive or the like. In other words, each of the rotor cores 27a and 27b is formed to have an IPM structure and a consequent pole structure.

As shown in FIGS. 18 and 19, the first magnetic pole portions 271a (271b) of the rotor core 27a (27b) are formed to include magnet covering portions 273 covering the outer peripheral sides of the permanent magnets 30 (31), pairs of voids 274 exposing both end surfaces of the permanent magnets 30 (31) and pairs of coupling portions 275 provided to correspond to the pairs of voids 274 respectively. The first magnetic pole portions 271a are provided with the hole portions 276a (276b) for mounting the permanent magnets 30 (31), to be continuous with the voids 274. The hole portions 276a (276b) are provided with pairs of engaging portions 277 engaging with portions of inclined portions 30a (31a) of the permanent magnets 30 closer to the inner peripheral side of the rotor core 27a (27b) by coming into contact with the same.

According to the fourth embodiment, the rotor core 27a (27b) is formed to be dividable in the circumferential direction, to include a plurality of core portions 270. The plurality of core portions 270 are provided with nut receiving holes 270a for receiving nuts 41, groove portions 270b for receiving bolts 42 and first key receiving grooves 270c constituting key receiving holes 53 for receiving key members 43.

According to the fourth embodiment, boundaries between the plurality of core portions 270 are arranged on portions corresponding to the first magnetic pole portions 271a (271b) of the rotor core 27a (27b). More specifically, the boundaries between the plurality of core portions 270 are arranged on central portions of the first magnetic pole portions 271a (271b) in the circumferential direction. Further, the boundaries between the plurality of core portions 270 are arranged every three first magnetic pole portions 271a (271b). In other words, each core portion 270 is formed to include two second magnetic pole portions 272a (272b) arranged between three first magnetic pole portions 271a (271b).

The remaining structure of the fourth embodiment is similar to that of the aforementioned first embodiment.

According to the fourth embodiment, as hereinabove described, the boundaries between the plurality of core portions 270 are arranged every three first magnetic pole portions 271a (271b). Thus, the number of division of the rotor core 27a (27b) can be more reduced as compared with a case of dividing the rotor core 27a (27b) on all first magnetic pole portions 271a (271b). Consequently, the rotor core 27a (27b) can be prevented from reduction of magnetic properties resulting from division thereof.

According to the fourth embodiment, as hereinabove described, the boundaries between the plurality of core portions 270 are arranged on the central portions (i.e., magnetic boundaries (see a straight line 12 in FIG. 7) of the first magnetic pole portions 271a (271b)) of the first magnetic pole portions 271a (271b) of the rotor core 27a (27b) in the circumferential direction. Thus, the rotor core 27a (27b) can be divided on least magnetically influenced portions of the first magnetic pole portions 271a (271b).

The remaining effects of the fourth embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the present invention is applied to the power generator of the wind power generation system in each of the aforementioned first to fourth embodiments, the present invention is not restricted to this. The present invention is applicable to a general rotating electric machine such as a power generator or a motor employed for a power generation system other than the wind power generation system.

While the rotor yoke and the rotor core are fastened to each other with the fastening members (fixing members) consisting of the nuts and the bolts in each of the aforementioned first to fourth embodiments, the present invention is not restricted to this. According to the present invention, the rotor yoke and the rotor core may be fixed to each other by fastening the same to each other with caulking members or the like, or threaded holes may be so formed in the rotor core that the rotor yoke and the rotor core are fixed to each other by fastening the same to each other with only bolts. According to the present invention, further, the rotor yoke and the rotor core may alternatively be fixed to each other with fixing members other than the fastening members.

While the fastening members (fixing members) consisting of the nuts and the bolts are arranged on the boundaries between the plurality of core portions in each of the aforementioned first to fourth embodiments, the present invention is not restricted to this. According to the present invention, the fixing members may alternatively be arranged on portions other than the boundaries between the plurality of core portions.

While the rotor core is formed to be dividable in the circumferential direction in each of the aforementioned first to fourth embodiments, the present invention is not restricted to this. According to the present invention, the rotor core may alternatively be constituted as an undividable component.

While the rotor is constituted of the rotor core having the consequent pole structure in each of the aforementioned first to fourth embodiments, the present invention is not restricted to this. According to the present invention, the rotor may alternatively be constituted of a rotor core having a structure other than the consequent pole structure.

While the radial thickness of the coupling portions is rendered smaller than the radial thickness of the magnet covering portions in each of the aforementioned first, second and fourth embodiments, the present invention is not restricted to this. According to the present invention, the radial thickness of the coupling portions may alternatively be rendered equal to the radial thickness of the magnet covering portions.

While the permanent magnets are mounted by providing the engaging portions on the rotor core and engaging the same with the permanent magnets in each of the aforementioned first to fourth embodiments, the present invention is not restricted to this. According to the present invention, the permanent magnets may alternatively be mounted with an adhesive, without providing engaging portions on the rotor core.

While the boundaries between the plurality of core portions are arranged on the magnetic boundaries (line-symmetry axes (see the straight line 11 in FIG. 7) of static magnetic fields in the second magnetic pole portions of the first embodiment or the line-symmetry axes (see the straight line 12 in FIG. 7) of static magnetic fields in the first magnetic pole portions of the fourth embodiment) of the rotor core in each of the aforementioned first to fourth embodiments, the present invention is not restricted to this. According to the present invention, the boundaries between the plurality of core portions may alternatively be arranged in the vicinity of the magnetic boundaries of the rotor core. According to this structure, the rotor core is divided in the vicinity of the least magnetically influenced portions thereof, whereby the rotor core can be effectively prevented from reduction of the magnetic properties. According to the present invention, the boundaries between the plurality of core portions may further alternatively be arranged on portions other than the magnetic boundaries of the rotor core and the vicinity thereof.

While the boundaries between the plurality of core portions are arranged every four second magnetic pole portions (so that each core portion includes three first magnetic pole portions arranged between four second magnetic pole portions) in each of the aforementioned first to third embodiments, the present invention is not restricted to this. According to the present invention, the boundaries between the plurality of core portions may alternatively be arranged every three or less second magnetic pole portions, or every five or more second magnetic pole portions. Similarly, while the boundaries between the plurality of core portions are arranged every three first magnetic pole portions (so that each core portion includes two second magnetic pole portions arranged between three first magnetic pole portions) in the aforementioned fourth embodiment, the boundaries between the plurality of core portions may alternatively be arranged every two or less first magnetic pole portions, or every four or more first magnetic pole portions in the present invention.

While the permanent magnets having the substantially trapezoidal sections are mounted on the rotor core having the SPM structure in the aforementioned third embodiment, the present invention is not restricted to this. According to the present invention, permanent magnets 32 (33) having substantially rectangular sections may alternatively be mounted on a rotor core 28 having an SPM structure, as in a rotor 20d according to a modification of the third embodiment shown in FIGS. 20 and 21.

Figure 20:
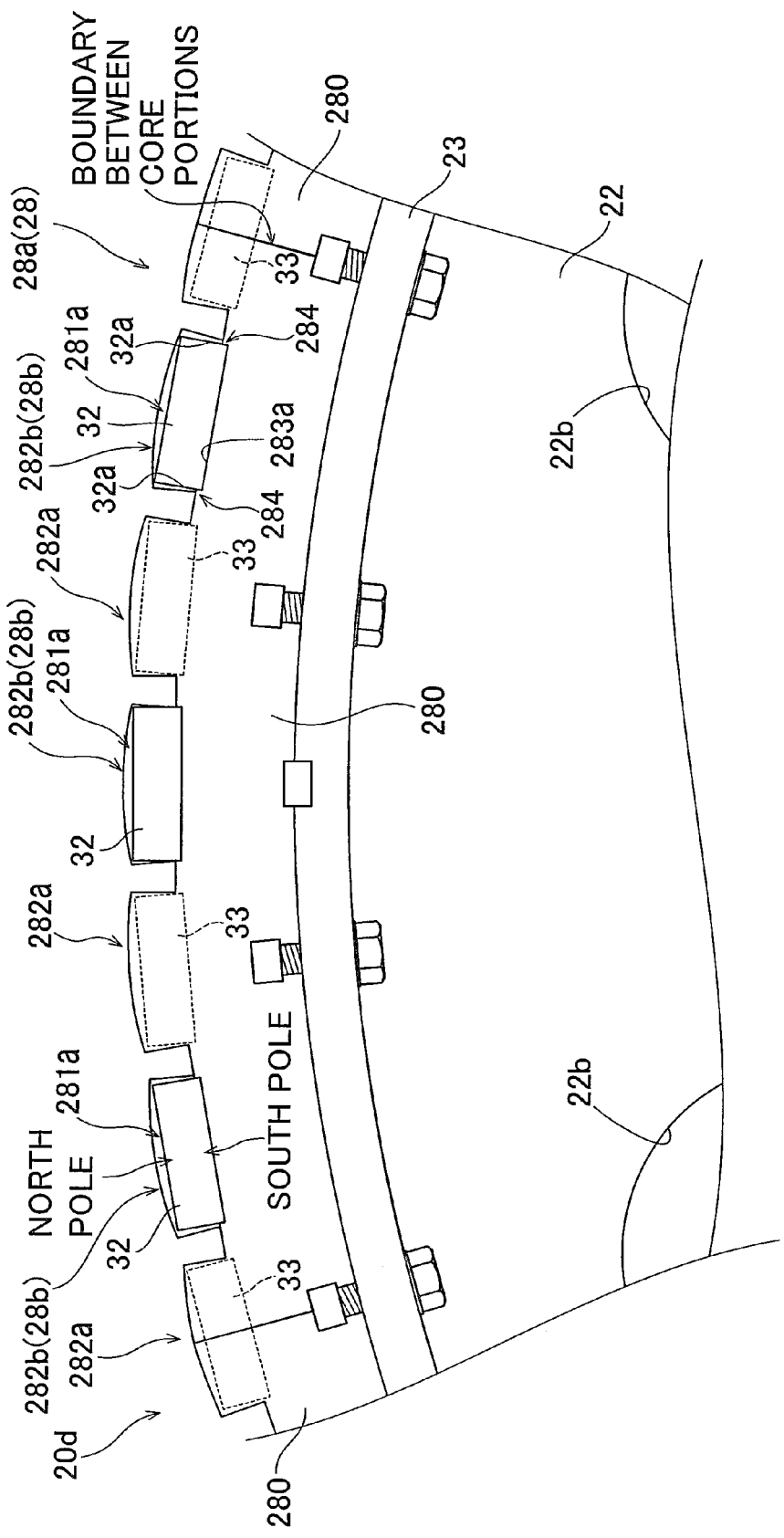
FIG. 20 is an enlarged view of a rotor according to a modification of the third embodiment of the present invention as viewed from one side in an axial direction.
Figure 21:
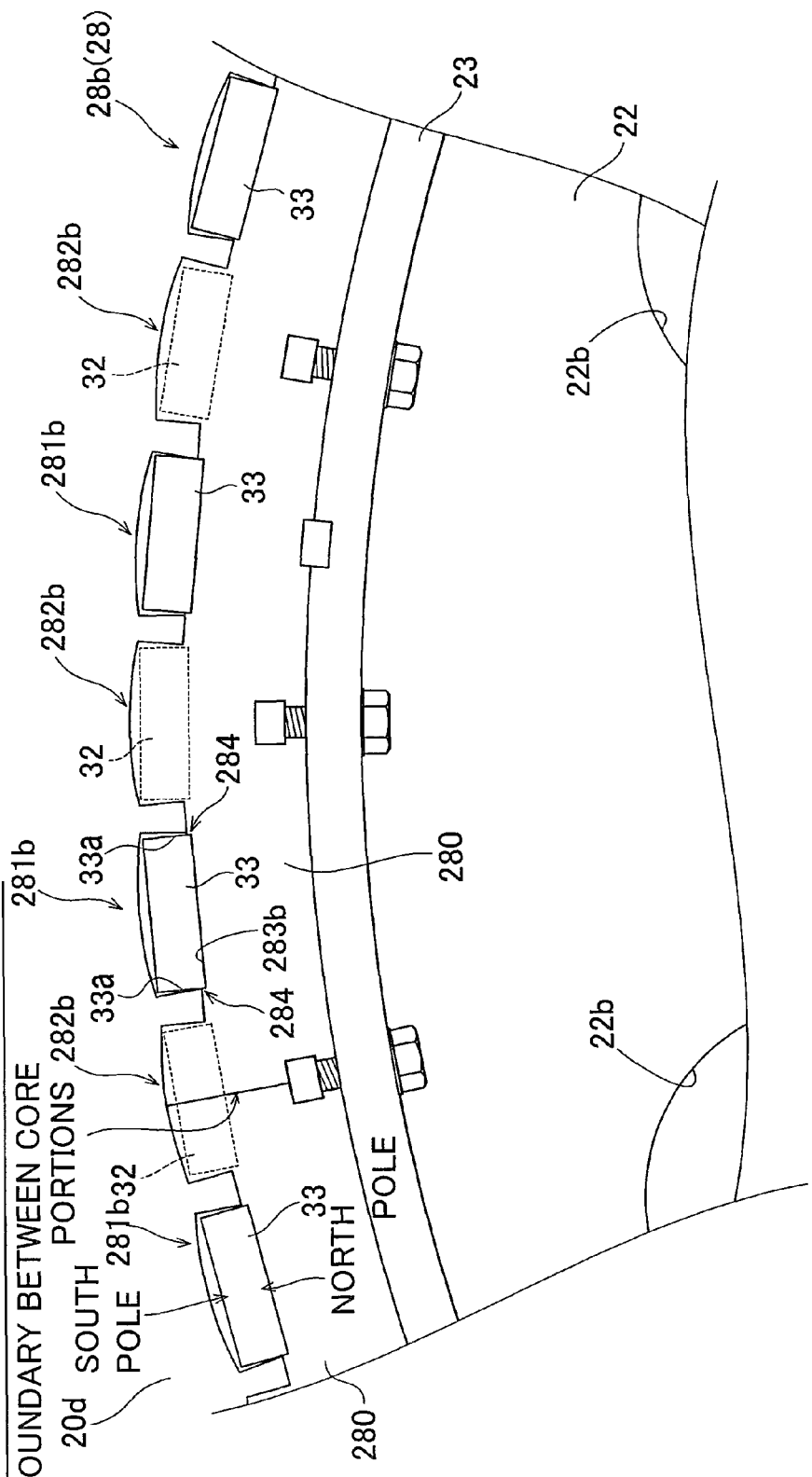
FIG. 21 is an enlarged view of the rotor shown in FIG. 20 as viewed from another side in the axial direction.

According to this modification of the third embodiment, the rotor core 28 of the rotor 20d is formed by arranging rotor cores 28a and 28b, each having a consequent pole structure and an SPM structure, to overlap with each other in an axial direction in a state deviating from each other by a prescribed angle (180° in electrical angle) in the direction of rotation, as shown in FIGS. 20 and 21.

In this modification of the third embodiment, further, the rotor core 28a (28b) is formed to be dividable in the circumferential direction, to include a plurality of core portions 280. Further, the rotor core 28a (28b) is formed by alternately circumferentially arranging a plurality of first magnetic pole portions 281a (281b) and a plurality of second magnetic pole portions 282a (282b) one by one. The first magnetic pole portions 281a (281b) of the rotor core 28a (28b) are provided with concave magnet mounting portions 283a (283b) for mounting the permanent magnets 32 (33) having the substantially rectangular sections thereon. The magnet mounting portions 283a (283b) are provided with pairs of engaging portions 284. The pairs of engaging portions 284 are formed to engage with portions of parallel portions 32a (33a), provided on end surfaces of the permanent magnets 32 (33), closer to the inner peripheral side of the rotor core 28a (28b).

According to the structure of this modification of the third embodiment, the rotor core 28a (28b) having the SPM structure, in which the permanent magnets 32 (33) can be easily manufactured, can be provided dissimilarly to a case of forming the permanent magnets 32 (33) in shapes (sectorial shapes, for example) other than the substantially rectangular shapes.

While the rotor is formed by overlapping the two rotor cores, each having the consequent pole structure, with each other in the axial direction in the state deviating from each other by the prescribed angle in the direction of rotation in each of the aforementioned first to fourth embodiments, the present invention is not restricted to this. According to the present invention, a rotor may alternatively be formed by one rotor core having a consequent pole structure, as in a modification of each of the first, second and fourth embodiments shown in FIG. 22 or another modification of the third embodiment shown in FIG. 23.

Figure 22:
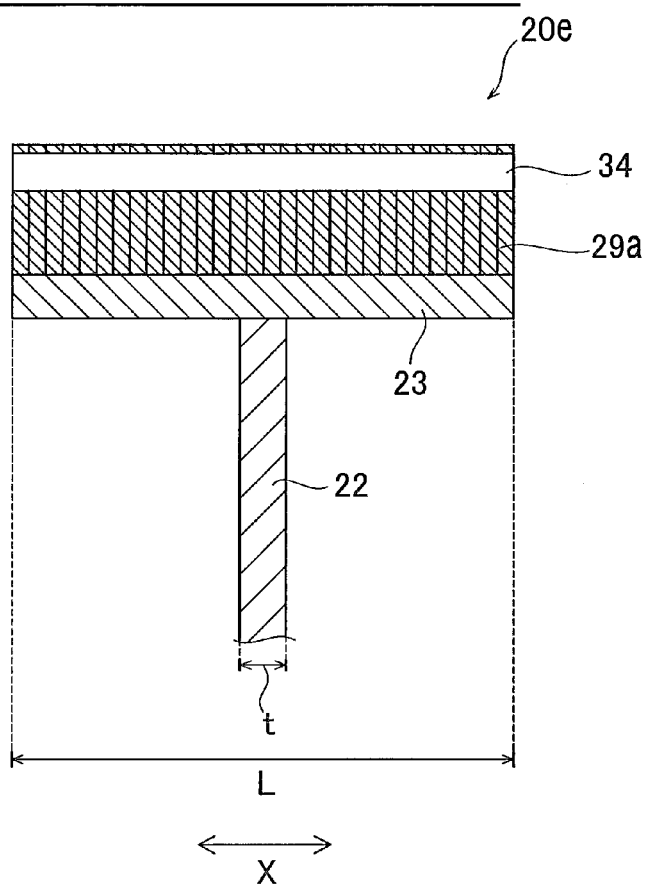
FIG. 22 is a sectional view of a rotor according to a modification of each of the first, second and fourth embodiments of the present invention along an axial direction.
Figure 23:
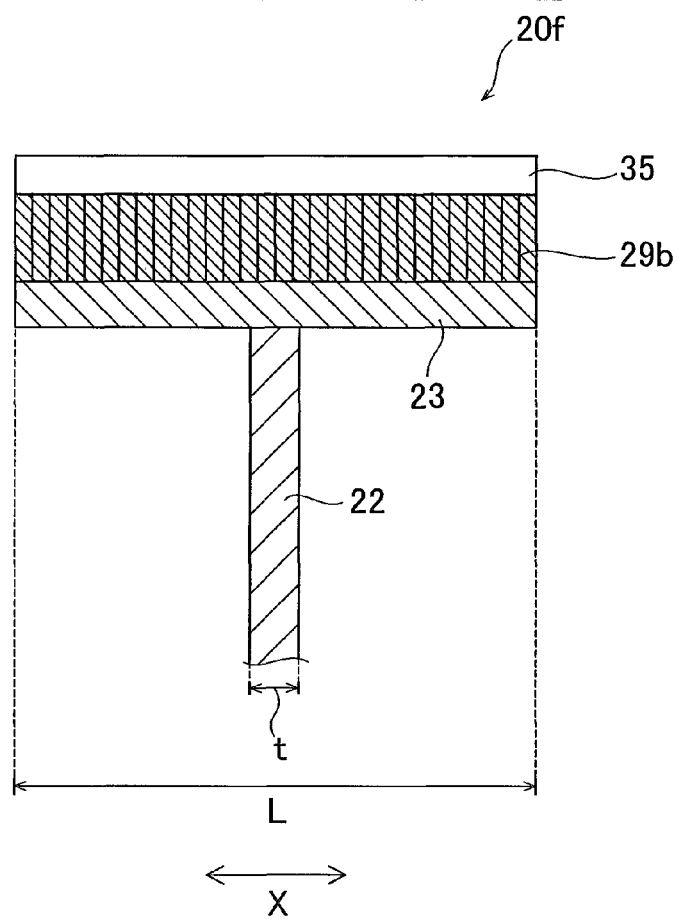
FIG. 23 is a sectional view of a rotor according to another modification of the third embodiment of the present invention along an axial direction.

In the modification of each of the first, second and fourths embodiment shown in FIG. 22, a rotor 20e is constituted of a rotor core 29a having an IPM structure, in which permanent magnets 34 are embedded. In the modification of the third embodiment shown in FIG. 23, on the other hand, a rotor 20f is constituted of a rotor core 29b of an SPM structure having permanent magnets 35 so mounted that outer periphery-side surfaces thereof are exposed.

According to the present invention, the rotor may alternatively be formed by overlapping at least three rotor cores, each having a consequent pole structure, with each other in the axial direction in a state deviating from each other by a prescribed angle in the direction of rotation. When the rotor is formed by overlapping an even number of rotor cores each having a consequent pole structure with each other in the axial direction in a state deviating from each other by a prescribed angle (180° in electrical angle) in the direction of rotation, magnetic flux can be generated in the gap between the outer peripheral portion of the rotor and the inner peripheral portion of the stator in a balanced manner as viewed from the axial direction.

While the key members are finally inserted into the key receiving holes consisting of the first key receiving grooves of the rotor core and the second key receiving grooves of the rotor yoke in each of the aforementioned first to fourth embodiments, the present invention is not restricted to this. According to the present invention, the key members may alternatively be first inserted into the second key receiving grooves of the rotor yoke. In this case, the plurality of core portions are circumferentially arranged on the outer peripheral surface of the rotor yoke, while inserting the key members into the first key receiving grooves. At this time, the groove portions on the inner peripheral portions of the core portions and the bolt receiving holes passing through the inner and outer peripheral surfaces of the rotor yoke are aligned with each other. Finally, the rotor yoke and the rotor core are fastened to each other with the nuts and the bolts.

Figure 24:
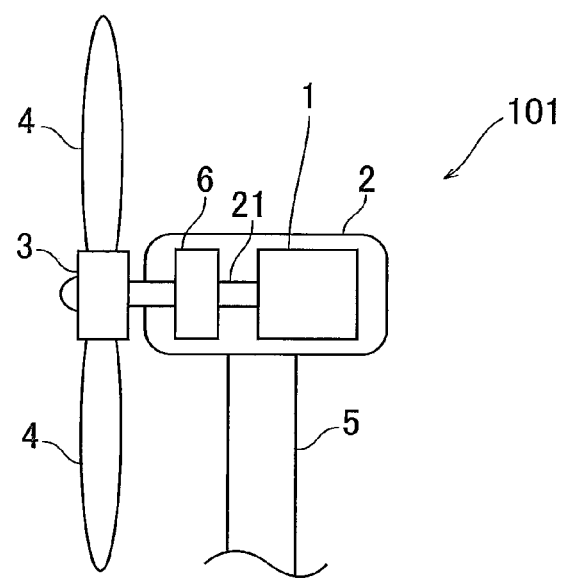
FIG. 24 is a schematic diagram showing the structure of a wind power generation system according to a modification of each of the first to fourth embodiments of the present invention.

While the rotor hub is directly mounted on the rotating shaft of the power generator in each of the aforementioned first to fourth embodiments, the present invention is not restricted to this. According to the present invention, a gear box 6 may alternatively be provided between a rotor hub 3 and a power generator 1, as in a wind power generation system 101 according to a modification of each of the first to fourth embodiments shown in FIG. 24.

What is claimed is:

1. A rotating electric machine comprising:
   a rotor including a rotating shaft portion, a rotor yoke surrounding said rotating shaft portion and a rotor core, arranged on the outer peripheral surface of said rotor yoke, having a plurality of permanent magnets circumferentially arranged thereon at intervals, the inner peripheral portion of said rotor core being fixed to said rotor yoke with a fixing member; and
   a stator arranged to be opposed to the outer peripheral surface of said rotor, wherein
   said rotor core is formed by alternately circumferentially arranging a plurality of first magnetic pole portions having said permanent magnets and a plurality of second magnetic pole portions having no said permanent magnets one by one, and
   said fixing member is arranged on a portion of the inner peripheral portion of said rotor core corresponding to said second magnetic pole portions.

2. The rotating electric machine according to claim 1, wherein
   said rotor core is formed to be dividable in the circumferential direction, to include a plurality of core portions.

3. The rotating electric machine according to claim 2, wherein
   said fixing member is arranged on the boundary between said plurality of core portions.

4. The rotating electric machine according to claim 2, wherein
   said rotor core is provided in a cylindrical shape having an inner peripheral surface arranged on the outer peripheral surface of said rotor yoke, and
   said plurality of core portions are formed to have substantially identical shapes obtained by dividing said cylindrical shape at substantially equiangular intervals.

5. The rotating electric machine according to claim 1, wherein
   said fixing member includes a nut and a bolt fitted into said nut,
   said nut extends toward the side of said rotor core in an axial direction, and includes a plurality of fit portions along said axial direction, and
   a plurality of said bolts are arranged along the extensional direction of said nut, and fitted into said plurality of fit portions of said nut.

6. The rotating electric machine according to claim 5, wherein
   a nut receiving hole receiving said nut and a groove portion connecting said nut receiving hole and the inner peripheral surface of said rotor core with each other are provided on the inner peripheral portion of said rotor core,
   said nut receiving hole and said groove portion are provided to extend in said axial direction of said rotor core, and so formed that the groove width of said groove portion is smaller than the hole width of said nut receiving hole, and
   said plurality of bolts are fitted into said plurality of fit portions of said nut inserted into said nut receiving hole through said groove portion extending in said axial direction.

7. The rotating electric machine according to claim 5, wherein
   said rotor further includes a discoidal support member surrounding said rotating shaft portion and in contact with the inner peripheral surface of said rotor yoke,
   said rotor yoke is provided in a cylindrical shape having an axial length larger than the thickness of said discoidal support member, and includes a plurality of bolt receiving holes formed on portions of the inner peripheral surface of said rotor yoke having said cylindrical shape projecting from said support member along said axial direction, and
   said plurality of bolts are fitted into said plurality of fit portions of said nut arranged to extend toward the side of said rotor core in said axial direction through said plurality of bolt receiving holes.

8. The rotating electric machine according to claim 1, wherein
   said plurality of permanent magnets are circumferentially embedded in the vicinity of the outer peripheral portion of said rotor core at intervals.

9. The rotating electric machine according to claim 1, wherein
   said first magnetic pole portions include magnet covering portions covering the outer peripheral sides of said permanent magnets, voids exposing end surfaces of said permanent magnets and coupling portions provided to correspond to said voids for coupling said magnet covering portions and said second magnetic pole portions adjacent to said first magnetic pole portions with each other along the outer periphery of said rotor core.

10. The rotating electric machine according to claim 9, wherein
    the radial thickness of said coupling portions is smaller than the radial thickness of said magnet covering portions.

11. The rotating electric machine according to claim 9, wherein
    corners of portions of said voids corresponding to said coupling portions closer to said second magnetic pole portions are formed to have arcuate sectional shapes.

12. The rotating electric machine according to claim 1, wherein
    said rotor core is formed to be dividable in the circumferential direction to include a plurality of core portions.

13. The rotating electric machine according to claim 12, wherein the boundaries between said plurality of core portions are arranged on portions of said rotor core corresponding to said second magnetic pole portions.

14. A rotating electric machine comprising:
a rotor including a rotating shaft portion, a rotor yoke surrounding said rotating shaft portion and a rotor core, arranged on the outer peripheral surface of said rotor yoke, having a plurality of permanent magnets circumferentially arranged thereon at intervals, the inner peripheral portion of said rotor core being fixed to said rotor yoke with a fixing member; and
a stator arranged to be opposed to the outer peripheral surface of said rotor, wherein
a first key receiving groove extending in an axial direction is formed on the inner peripheral portion of said rotor core,
a second key receiving groove is formed on the outer peripheral surface of said rotor yoke to correspond to said first key receiving groove of said rotor core, and
a key member is inserted into a key receiving hole formed by said first key receiving groove and said second key receiving groove.

15. A wind power generation system comprising:
a power generator including a rotor and a stator arranged to be opposed to the outer peripheral surface of said rotor; and
a blade connected to said rotor of said power generator, wherein
said rotor includes:
a rotating shaft portion,
a rotor yoke surrounding said rotating shaft portion, and
a rotor core, arranged on the outer peripheral surface of said rotor yoke, having a plurality of permanent magnets circumferentially arranged thereon at intervals, and
said rotor yoke and the inner peripheral portion of said rotor core are fixed to each other with a fixing member, wherein
said rotor core is formed by alternately circumferentially arranging a plurality of first magnetic pole portions having said permanent magnets and a plurality of second magnetic pole portions having no said permanent magnets one by one, and
said fixing member is arranged on a portion of the inner peripheral portion of said rotor core corresponding to said second magnetic pole portions.

16. The wind power generation system according to claim 15, wherein
said rotor core of said rotor of said power generator is formed to be dividable in the circumferential direction to include a plurality of core portions.

17. The wind power generation system according to claim 15, wherein
said plurality of permanent magnets are circumferentially embedded in the vicinity of the outer peripheral portion of said rotor core of said rotor of said power generator at intervals.

18. The wind power generation system according to claim 15, wherein
said first magnetic pole portions include magnet covering portions covering the outer peripheral sides of said permanent magnets, voids exposing end surfaces of said permanent magnets and coupling portions provided to correspond to said voids for coupling said magnet covering portions and said second magnetic pole portions adjacent to said first magnetic pole portions with each other along the outer periphery of said rotor core.

19. The wind power generation system according to claim 15, wherein
said rotor core of said rotor of said power generator is formed to be dividable in the circumferential direction to include a plurality of core portions.

* * * * *